(12) United States Patent
Urakami et al.

(10) Patent No.: US 7,305,330 B2
(45) Date of Patent: *Dec. 4, 2007

(54) LIFE PREDICTING METHOD FOR ROLLING BEARING, LIFE PREDICTING DEVICE, ROLLING BEARING SELECTING DEVICE USING LIFE PREDICTING DEVICE, PROGRAM AND ENVIRONMENT COEFFICIENT DETERMINING METHOD

(75) Inventors: Seigou Urakami, Yamato (JP); Youichi Matsumoto, Yokohama (JP); Yasuo Murakami, Hadano (JP)

(73) Assignee: NSK Ltd., Tokyo (JP)

( * ) Notice: Subject to any disclaimer, the term of this patent is extended or adjusted under 35 U.S.C. 154(b) by 390 days.

This patent is subject to a terminal disclaimer.

(21) Appl. No.: 10/493,245

(22) PCT Filed: Oct. 24, 2002

(86) PCT No.: PCT/JP02/11055

§ 371 (c)(1),
(2), (4) Date: Apr. 21, 2004

(87) PCT Pub. No.: WO03/036112

PCT Pub. Date: May 1, 2003

(65) Prior Publication Data

US 2004/0249619 A1    Dec. 9, 2004

(30) Foreign Application Priority Data

Oct. 26, 2001   (JP)   ............... 2001-329878

(51) Int. Cl.
G06G 7/48 (2006.01)
G06F 7/60 (2006.01)

(52) U.S. Cl. .............................. 703/6; 703/2

(58) Field of Classification Search ............... 703/2, 703/6
See application file for complete search history.

(56) References Cited

U.S. PATENT DOCUMENTS 5,001,931 A * 3/1991 Nishimoto et al. ........... 73/587

(Continued)

FOREIGN PATENT DOCUMENTS

JP    8-221480    8/1996

(Continued)

OTHER PUBLICATIONS

Takemura et al., "Development of a new life equation for ball and roller bearings", SAE Technical Paper Series, No. 2000-01-2601, Sep. 11, 2000, XP001202109.*

(Continued)

*Primary Examiner*—Paul Rodriguez
*Assistant Examiner*—Eunhee Kim
(74) *Attorney, Agent, or Firm*—Crowell & Moring LLP

(57) ABSTRACT

To predict a correction rated life at high accuracy. A life predicting device executes step S1, step S2, step S4 for inputting specification information including a basic dynamic rated load C and basic static rated load $C_0$, step 5 for computing a dynamic equivalent load P based on the specification information. step S3 for setting a reliability factor $a_1$, step S7 and step S8 for determining a contact ellipse area S, step S9 for inputting a foreign substance purchasing diameter $d_{debris}$ ("debris" means "foreign substance"), step 10 for determining a standardized foreign substance diameter ($d_{debris}/\sqrt{S}$), step S11 for setting a life correction coefficient $a_{xyz}$ based on the standardized foreign substance diameter, and step S6 and step S12 for calculating a correction rated life $L_{nm}$ based on the reliability coefficient, the life correction coefficient, the basic dynamic rated load and the dynamic equivalent load and the like.

12 Claims, 21 Drawing Sheets

U.S. PATENT DOCUMENTS 7,006,953 B2 * 2/2006 Takemura et al. ............. 703/2
2002/0069044 A1 * 6/2002 Berg et al. .................... 703/22
2002/0197877 A1 * 12/2002 Suzuki et al. ............... 384/488

FOREIGN PATENT DOCUMENTS

| JP | 9-292311 | 11/1997 |
|---|---|---|
| JP | 10-261036 | 9/1998 |
| JP | 2002-148148 | 5/2002 |

OTHER PUBLICATIONS

Ionnides et al., "A New Fatigue Life Model For Rolling Bearings", Journal of Tribology, American Society of Mechanical Engineers, New Yourk, NY, vol. 107 Jul. 1985, pp. 367-378, XP002949481.*

Hodowanec, "Evaluation of Antifriction Bearing Lubrication Methods on Motor Life-Cycle Cost", IEEE Nov. 1999, pp. 1247-1251.*

Kyozaburo et al. "The Development of Bearing Steels for Long Life Rolling Bearings Under Clean Lubrication and Contaminated Lubrication", 1993, ASTM STP 1195, pp. 199-210.*

Poplawski et al. "Effect of Roller Profile on cylindrical Roller Bearing Life prediction", NASA/TM-2000-210368, Aug. 2000, pp. 1-26.*

* cited by examiner

FIG. 7

BEARING TABLE

DEEP GROOVE BALL BEARING

| BEARING NUMBER | INNER DIAMETER d(mm) | OUTER DIAMETER D(mm) | WIDTH B(mm) | BASIC DYNAMIC RATED LOAD C(kgf) |
|---|---|---|---|---|
| 6006 | 30 | 55 | 13 | 1350 |
| 6206 | 30 | 62 | 16 | 1980 |
| 6306 | 30 | 72 | 19 | 2700 |
| 6012 | 60 | 95 | 18 | 3000 |
| 6212 | 60 | 110 | 22 | 5350 |
| 6312 | 60 | 130 | 31 | 8350 |
| 6017 | 85 | 130 | 22 | 5050 |
| 6217 | 85 | 150 | 28 | 8550 |

- 31 GRAPHIC DISPLAY
- 32 LIFE CALCULATION BY EXISTING FORMULA
- 33 NEW LIFE CALCULATION
- 35 RETURN
- 36 MENU
- 37 END

FIG. 14

DEFINITION FOR LOAD COEFFICIENT

LOAD EXERTING ON A BEARING IS GENERALLY A LOAD CAUSED BY THE WEIGHT OF AN OBJECT SUPPORTED BY THE BEARING, OWN WEIGHT OF A ROTATIONAL BODY, TRANSMISSION FORCE OF GEAR OR BELT AND OPERATION OF MACHINE. SOME OF THE LOAD CAN BE THEORETICALLY CALCULATED FOR NUMERAL VALUE BUT OTHERS ARE DIFFICULT TO BE CALCULATED. FURTHER, SINCE MOST OF MACHINES ARE ACCOMPANIED VIBRATIONS OR IMPACT SHOCKS DURING OPERATION, IT IS DIFFICULT TO ACCURATELY DETERMINE ALL THE LOADS EXERTING ON THE BEARING. ACCORDINGLY, EXERTING LOADS HAVE TO BE TAKEN INTO CONSIDERATION BY CORRECTING THE LOAD COEFFICIENT ($f_w$) AS A COEFFICIENT OBTAINED EMPIRICALLY TO THE CALCULATED LOAD. EVEN WHEN THE RADIAL LOAD AND AXIAL LOAD ARE OBTAINED BY CALCULATION, LOADS EXERTING ACTUALLY ON THE BEARING OFTEN INCREASE MORE THAN THE CALCULATED VALUE DUE TO VIBRATIONS OR IMPACTS EXERTING ON THE MACHINE. THE LOAD CAN BE DETERMINED ACCORDING TO THE FOLLOWING FORMULA.

$$\left. \begin{array}{l} F_r = f_w \cdot F_{ro} \\ F_a = f_w \cdot F_{ao} \end{array} \right\} \quad \text{IN WHICH } F_r, F_a : \text{LOAD (N) EXERTING ON BEARING} \\ F_{ro}, F_{ao} : \text{THEORETICAL CALCULATED LOAD (N)} \\ f_w : \text{LOAD COEFFICIENT}$$

THE LOAD COEFFICIENT $f_w$ IS DETERMINED GENERALLY BASED ON THE VALUES SHOWN BELOW.

| OPERATION CONDITION | PLACE FOR USE | $f_w$ |
|---|---|---|
| UNDER SMOOTH OPERATION WITH NO IMPACT SHOCK | ELECTRIC MOTOR, MACHINE TOOL, AIR CONDITIONING MACHINES | 1~1.2 |
| UNDER USUAL OPERATION | BLOWER, COMPRESSOR LIFT, CRANE, PAPER MAKING MACHINE | 1.2~1.5 |
| UNDER OPERATION WITH IMPACT SHOCKS AND VIBRATIONS | BUILDING MACHINES, CRUSHERS, VIBRATORY SIEVES, ROLLING MILLS | 1.5~3 |

[CLOSE]

FIG. 15

ON RELIABILITY COEFFICIENT

FLAKING PHENOMENON OF BEARING LEADING TO ROLLING FATIGUE IS RULED UNDER STATISTICAL PROBABILITY. ACCORDINGLY IT IS NECESSARY TO INTRODUCE A PROBABILITY SUCH AS A RELIABILITY FOR THE CALCULATION OF THE ROLLING FATIGUE LIFE. THE RELIABILITY COEFFICIENT $a_1$ IS A COEFFICIENT FOR CORRECTING THE RELIABILITY OF 90% OR MORE AS SHOWN IN THE FOLLOWING TABLE.
FOR EXAMPLE, A VALUE OF A RELIABILITY COEFFICIENT: $a_1 = 0.21$ IS USED FOR THE FATIGUE LIFE AT 99% RELIABILITY.

| FLAKING PROBABILITY(%) | 10 | 5 | 4 | 3 | 2 | 1 |
|---|---|---|---|---|---|---|
| FATIGUE LIFE | $L_{10}$ | $L_5$ | $L_4$ | $L_3$ | $L_2$ | $L_1$ |
| RELIABILITY(%) | 90 | 95 | 96 | 97 | 98 | 99 |
| $a_1$ | 1.00 | 0.62 | 0.53 | 0.44 | 0.33 | 0.21 |

[CLOSE]

LIFE PREDICTING METHOD FOR ROLLING BEARING, LIFE PREDICTING DEVICE, ROLLING BEARING SELECTING DEVICE USING LIFE PREDICTING DEVICE, PROGRAM AND ENVIRONMENT COEFFICIENT DETERMINING METHOD

BACKGROUND OF THE INVENTION

The present invention concerns a life predicting method for a rolling bearing, a life predicting device, a rolling bearing selecting device using the life predicting device, a program therefor and an environment coefficient determining method.

A basic rated life $L_{10}$ of a rolling bearing is defined in JIS B 1518: 1992 and, usually, a calculation formula as shown in the following formula (1) is used.

$$L_{10} = (C/P)^p \quad (1)$$

in which C represents a basic dynamic rated load of a rolling bearing and P represents a dynamic equivalent load exerting on the bearing. Further, p represents a load index which is set at p=3 in the case of a ball bearing and p=10/3 in the case of a roller bearing. The basic rated life $L_{10}$ is defined for a case at a reliability of 90%, using a material used generally, for usual manufacturing quality and under usual working conditions.

It is noted that in the calculation formula for the basic rated life, only the effect of the bearing load on the bearing life is taken into consideration. In view of the above, the result of the calculation formula for the basic rated life is greatly different from the result of life in the market at present. This is because the fatigue life has also been improved by the improvement in the bearing steel materials, and the effect of the lubricant film thickness at the contact portion between a bearing ring and a rolling element on the fatigue life has been analyzed by a study on the theory of elastic fluid lubrication in recent years. A correction rated life $L_{nm}$ reflecting the effect of them on the life calculation formula was proposed as the following formula (2) by using a life correction coefficient $a_{xyz}$ by ISO 281 in February, 2000.

$$L_{nm} = a_1 \cdot a_{xyz} \cdot L_{10} \quad (2)$$

Further, the life correction coefficient $a_{xyz}$ is shown by the following equation (3).

$$a_{xyz} = f(Pu, \kappa, a_c) \quad (3)$$

The life correction coefficient $a_{xyz}$ is represented as a function considering factors such as fatigue limit load Pu, lubrication state (kinetic viscosity) $\kappa$, and environment coefficient (contamination degree of lubricant) $a_c$. Further, $a_1$ is a reliability coefficient which is described in the following Table 1 and it takes a lower value as the reliability is improved.

TABLE 1

| Reliability % | $L_{na}$ | $a_1$ |
|---|---|---|
| 90 | $L_{10a}$ | 1 |
| 95 | $L_{5a}$ | 0.62 |
| 96 | $L_{4a}$ | 0.53 |
| 97 | $L_{3a}$ | 0.44 |
| 98 | $L_{2a}$ | 0.33 |
| 99 | $L_{1a}$ | 0.21 |

However, among the variables representing the life correction coefficient $a_{xyz}$, the fatigue limit load Pu and the lubrication state (kinetic viscosity) $\kappa$ are considered quantifiable. However, while the weight, size, shape and substance of foreign substance are considered for the contamination degree $a_c$ of the lubricant, they are not quantitatively evaluated but merely represent the environment ambiguously. This has resulted in a problem that the life can not be predicted at high accuracy according to the formula (2).

The present invention has been achieved taking into consideration factors of the prior art which had not theretofore been apparent and it is an object thereof to provide a life predicting method for a rolling bearing capable of predicting the life at a high accuracy according to the formula (2) for calculating a correction rated life, a life predicting device, a rolling bearing selecting device using the life predicting device, a program therefor and an environment coefficient determining method.

SUMMARY OF THE INVENTION

In one embodiment of the bearing life predicting method for a rolling bearing according to the present invention, a basic dynamic rated load C and a basic static rated load $C_0$ can be calculated, wherein the correction rated life $L_{nm}$ of a rolling bearing at a reliability coefficient $a_1$ is calculated according to:

$$L_{nm} = a_1 \times a_{xyz} \times (C/P)^p$$

$$a_{xyz} \propto f(\alpha)$$

where P represents an equivalent load, p represents a load index, $a_{xyz}$ represents a life correction coefficient, and $\alpha$ represents a ratio between a typical dimension for a portion of a bearing to be in contact with a mixed foreign substance and a characteristic quantity showing the size of the mixed foreign substance.

Thus, the life correction coefficient $a_{xyz}$ can be set in accordance with the characteristic quantity showing the size of the mixed foreign substance and, further, since the value $\alpha$ for the ratio thereof with the typical dimension for the portion of the bearing in contact with the mixed foreign substance is used for the setting, the life correction coefficient $a_{xyz}$ can be set in accordance with the mixed foreign substance not depending on the size of the bearing.

In a further aspect of the invention, the ratio $\alpha$ is calculated according to:

$$\alpha = d/\sqrt{S}$$

where $\sqrt{S}$ represents the typical dimension assuming a typical diameter of the mixed foreign substance as d, and a contact ellipse area in the bearing as S.

Thus, the value $\alpha$ for the ratio is determined by using a contact ellipse area in the bearing and the life correction coefficient $a_{xyz}$ can be set according to the determined value $\alpha$ for the ratio.

Furthermore, the function f is determined based on an empirical formula obtained by mixing the foreign substance having different characteristic quantities with respect to the size, respectively.

Thus, since the life correction coefficient $a_{xyz}$ can be obtained based on the experimental formula obtained previously by the value $\alpha$ for the ratio, the life can be predicted at a higher accuracy.

Still further, the function f has a viscosity ratio $\kappa$ of a lubricant, a fatigue limit load Pu and a contamination degree coefficient $a_c$ as variables, and the contamination $a_c$ has the value α for the ratio as a variable.

Thus, the present invention is applicable also in a case of determining the correction rated life based on the life correction coefficient $a_{xyz}$ using the viscosity ratio κ of the lubricant, the fatigue limit load Pu and the contamination degree coefficient $a_c$ as the variables proposed by ISO 281 in February, 2000.

A further aspect of the present invention is a life predicting device for a rolling bearing for conducting life prediction of a rolling bearing such that a basic dynamic rated load C and a basic static rated load $C_0$ can be calculated, comprising a specification information inputting means for inputting specification information containing a basic dynamic rated load C and a basic static rated load $C_0$ of the rolling bearing, a dynamic equivalent load computation means for computing a dynamic equivalent load based on the specification information inputted by the specification information inputting means, a reliability setting means for setting a reliability coefficient, a typical dimension determining means for determining a typical dimension for a portion of a bearing in contact with mixed foreign substance, a mixed foreign substance characteristic quantity inputting means for inputting a characteristic quantity showing the size of the mixed foreign substance, a ratio computing means for computing the value for the ratio between the typical dimension and the characteristic quantity, a life correction coefficient setting means for setting a life correction coefficient based on the value for the ratio, and a bearing life computation means for computing the bearing life based on the reliability coefficient, the life correction coefficient, the basic dynamic rated load, the dynamic equivalent load and the load index.

Further, the life predicting device for a rolling bearing according to the present invention inputs specification information by a specification information inputting means, sets a reliability coefficient by a reliability setting means, determines a typical dimension by a typical dimension determining means, inputting a characteristic quantity showing the size of the mixed foreign substance by a mixed foreign substance characteristic quantity inputting means, determining the value α for the ratio between the typical dimension and the characteristic quantity by a ratio computing means, thereby setting a life correction coefficient $a_{xyz}$ by computation for:

$$a_{xyz} \propto f(\alpha)$$

by a life correction coefficient setting means, and computing the bearing life $L_{nm}$ by computation of $$L_{nm} = a_1 \times a_{xyz} \times (C/P)^p$$

based on the reliability coefficient $a_{xyz}$, the life correction coefficient $a_1$, the basic dynamic rated load C, the dynamic equivalent load P, and the load index p.

Further, a life predicting device for a rolling bearing according to the present invention has a feature for conducting life prediction of a rolling bearing specified such that a basic dynamic rated load C and a basic static rated load $C_0$ can be calculated, comprising a specification information inputting means for inputting specification information containing a basic dynamic rated load C and a basic static rated load $C_0$ of the rolling bearing, a dynamic equivalent load computation means for computing a dynamic equivalent load based on the specification information inputted by the specification information inputting means, a reliability setting means for setting a reliability coefficient, a typical dimension determining means for determining a typical dimension for a portion of a bearing in contact with mixed foreign substance, a mixed foreign substance characteristic quantity inputting means for inputting a characteristic quantity showing the size of the mixed foreign substance, a ratio computing means for computing the value for the ratio between the typical dimension and the characteristic quantity, a life correction coefficient setting means for setting a life correction coefficient based on the value for the ratio, a bearing life computation means for computing the bearing life based on the reliability coefficient, the life correction coefficient, the basic dynamic rated load, the dynamic equivalent load and the load index, and a re-computation judging means whether re-calculation is necessary or not for matching a desired life in a case where the result of computation by the bearing life computation means does not correspond to the desired life. The bearing life predicting device for the rolling bearing judges, when the result of computation by the bearing life computation means does not correspond to a desired life, whether re-calculation is necessary or not for satisfying the desired life by the re-computation judging means and, in a case where re-calculation is necessary, conducts re-calculation by selecting, for example, change of the rolling bearing number to a greater one or change of the mixed foreign substance diameter thereby deciding a rolling bearing that can satisfy the desired life.

The life predicting device for the rolling bearing can determine the value α for the ratio using the contact ellipse area in the bearing and can set the life correction coefficient $a_{xyz}$ by the value α for the ratio.

Further, it has feature in that the life correction coefficient setting means sets a life correction coefficient obtained by substituting the value for the ratio in the empirical formula obtained by mixing the foreign substance having different characteristic quantities respectively with respect to the size in the bearing.

Since the life correction coefficient $a_{xyz}$ can be obtained based on the empirical formula previously obtained by the value α for the ratio, the life predicting device for the rolling bearing can predict life at a higher accuracy.

Further, it has a feature in that the life correction coefficient setting means sets the life correction coefficient with reference to a viscosity ratio of a lubricant, a fatigue limit load, and a contamination degree coefficient which changes depending on the value for the ratio.

The life predicting device for the rolling bearing is applicable also in a case of determining the correction rated life based on the life correction coefficient $a_{xyz}$ using the viscosity ratio κ of the lubricant, the fatigue limit load Pu, and the contamination degree coefficient $a_x$ as variants proposed by ISO 281 in February, 2000.

Further, a rolling bearing selecting device using a life predicting device for a rolling bearing comprises a bearing species inputting means for inputting a bearing species desired by a user, a specification information inputting means for inputting necessary specification information other than the required specification information required by the user from necessary specification information containing a basic dynamic rated load C and a basic static rated load $C_0$ of the rolling bearing, a specification information assuming means for comparing the required specification information inputted by the specification information inputting means and the necessary specification information thereby assuming the not-inputted specification information, a life predicting device for the rolling bearing conducting bearing life predicting computation based on the specification information inputted by the specification information inputting means and the specification information assumed by the specification information assuming means, a judging means for judging whether the result of computation by the life predicting device can satisfy the specification information inputted by the specification information inputting means or not, a specification information presenting means for presenting the specification information set by the specification information assuming means when the result of the judgment by the judging means can satisfy the specification information, and a re-computing means for changing the specification information assumed by the specification information assuming means and conducting re-computation by the life predicting device for the rolling bearing when the result of the judgment of the judging means can not satisfy the specification information.

In the rolling bearing selecting device using the life predicting device for the rolling bearing, a bearing type such as a ball bearing, a roller bearing, a radial bearing, a thrust bearing or the like is inputted by the bearing species inputting means and, when a user intends to know any one of the optimal bearing, the optimal operation condition and the life predicting time, and inputs the remaining two required items of specification information by the specification information inputting means, the specification information assuming means assumed any one of the optimal bearing, the optimal operation condition and the life predicting time, and conducts the predicting life computation based on the required specification information and the assumed information. For example, in a case where the optimal operation condition is intended to be known and when the name of the bearing to be used and the required life time are inputted, it assumes the load exerting on the bearing, the number of rotations of the bearing and the mixed foreign substance diameter respectively, conducts life predicting computation, conducts the life predicting computation while changing the specification information assumed by the specification information assuming means in a case where the life predicting time does not satisfy the required life time and, when the life predicting computation satisfying the required life time is conducted, presents the operation condition as the optimal operation condition by the specification information presenting means.

Still further, the specification information inputting means, the specification information assuming means, the life predicting device for the rolling bearing, the judging means, the specification information presenting means and the re-computation means are adapted accessable by way of an internet.

In the rolling bearing selecting device using the life predicting device for the rolling bearing, any one of the optimal bearing, the optimal operation condition, and the life predicting time can be selected easily at the information terminal owned by the user when the user conducts access by way of the internet to the specification information inputting means, the specification information assuming means, the life predicting device for the rolling bearing, the judging means, the specification information presenting means and the re-computation means.

The rolling bearing selecting device further comprises a user registration accepting means for accepting the user registration by way of the internet, and adapted such that only the user registered by the user registration accepting means can access by way of the internet to the specification information inputting means, the specification information assuming means, the life predicting device for rolling bearing, the judging means, the specification information presenting means and the re-computation means.

In the rolling bearing selecting device using the life predicting device for the rolling bearing, since only the user who is registered by the user registration accepting means can select any one of the optimal bearing, the optimal operation condition and the life predicting time by way of the internet, the user information can be obtained by the user registration accepting means.

Since the rolling bearing selecting device using the life predicting device for the rolling bearing can select the language to be used in the specification information inputting means, the specification information assuming means, the life predicting device for the rolling bearing, the judging means, the specification information presenting means and the re-computation means, the rolling bearing can be selected by using a language desired by a user by optionally selecting a language such as Japanese, English, German or French.

Further, the specification information presenting means is adapted to conduct any one of presentation for the life prediction of the rolling bearing, presentation of the optimal bearing and presentation of the optimal working condition.

The rolling bearing selecting device using the life predicting device for the rolling bearing can appropriately present any one of the life time, the optimal bearing and the optimal working condition of the rolling bearing desired by the user.

Further it comprises a delivery information presenting means presenting at least one of the delivery date or the estimated sum for the rolling bearing based on the specification information presented by the specification information presenting means.

The rolling bearing selecting device using the life predicting device for the rolling bearing can present, when the specification information presenting means presents the optimal bearing, the optimal operation condition and the life predicting time, the delivery time and the estimated sum of the corresponding bearing, so that it is not necessary for a user to request the presentation of the delivery time or the estimated sum.

Further, a program according to the present invention has a memory medium storing a life predicting program for predicting the life of a rolling bearing specified such that a basic dynamic rated load $C$ and a basic static rated load $C_0$ can be calculated, comprising descriptions for executing, by a computer, a step of inputting specification information containing the basic dynamic rated load $C$ and the basic static rated load $C_0$ of the rolling bearing, a step of computing a dynamic equivalent load based on the specification information, a step of setting a reliability coefficient, a step of determining a typical dimension for a portion of the bearing in contact with mixed foreign substance, a step of inputting a characteristic quantity indicating the size of the mixed foreign substance, a step of computing the value for the ratio between the typical dimension and the characteristic quantity, a step of setting the life correction coefficient based-on the value for the ratio, and a step of computing the bearing life based on the reliability coefficient, the life correction coefficient, the basic dynamic rated load, the dynamic equivalent load, and the load index.

Still further, the program according to the present invention has a memory medium storing a life predicting program for predicting life of a rolling bearing specified such that a basic dynamic rated load $C$ and a basic static rated load $C_0$ can be calculated, comprising descriptions for executing, by a computer, a step of inputting specification information containing the basic dynamic rated load $C$ and the basic static rated load $C_0$ of the rolling bearing, a step of computing a dynamic equivalent load based on the specification information, a step of setting a reliability coefficient, a step of determining a typical dimension for a portion of the bearing in contact with mixed foreign substance, a step of inputting a characteristic quantity indicating the size of the mixed foreign substance, a step of computing the value for the ratio between the typical dimension and the characteristic quantity, a step of setting a life correction coefficient based on the value for the ratio, a step of computing the bearing life based on the reliability coefficient, the life correction coefficient, the basic dynamic rated load, the dynamic equivalent load, and the load index, and a step of judging whether the re-computation for matching a desired life is necessary or not in a case where the result of computation for the bearing life does not match the desired life.

A program according to the present invention has a memory medium storing a bearing selecting program for selecting a rolling bearing in accordance with the specification required by a user, comprising descriptions for executing, by a computer, a step of inputting a bearing species required by a user, a step of inputting necessary specification information other than the required specification information required by the user from the necessary specification information containing a basic dynamic rated load C and the basic static rated load $C_0$ of the rolling bearing, a step of comparing the required specification information and the necessary specification information thereby assuming the not inputted specification information, a step of predicting life by using the life predicting program according to claim 16 based on the required specification information and the assumed specification information other than that described above, a step of judging whether the result of the life prediction can satisfy the required specification information or not, a step of presenting the assumed specification information as the bearing selection information when the result of the life prediction can satisfy the required specification information, and a step of changing the assumed specification information in a case whether the result of the life prediction can not satisfy the required specification information and conducting re-computation by the life predicting program.

The environment coefficient determining method according to the invention determines an environment coefficient for the life correction coefficient used in the bearing life calculation, wherein the environment coefficient is determined at least by the ratio between a typical dimension for the portion of the bearing in contact with a mixed foreign substance and a characteristic quantity indicating the size of the mixed foreign substance.

The life correction coefficient $a_{xyz}$ for the correction rated life $L_{nm}$ proposed by ISO 281 in February, 2000 is represented as a function by taking factors such as the fatigue limit load Pu, the lubrication state (kinetic viscosity) κ, and the environment coefficient (contamination degree of lubricant) $a_c$ into consideration. Then, the weight, the size, the shape and the type of the foreign substances are taken into consideration for the environmental coefficient (contamination degree of lubricant).

That is, according to the environmental coefficient determining method, the environment coefficient (contamination degree of lubricant) $a_c$ used for the bearing life calculation is quantitatively evaluated by using at least the size of the foreign substance among the weight, size, shape and type of the foreign substances, and the evaluation is conducted by using the value α for the ratio with the typical dimension for the portion of the bearing in contact with the mixed foreign substance, without depending on the size of the bearing.

The value for the ratio is calculated by:

$$\alpha = d/\sqrt{S}$$

where $\sqrt{S}$ represents the typical dimension assuming a typical diameter of the mixed foreign substance as d, and a contact ellipse area in the bearing as S. Thus, the value α for the ratio is determined by using the contact ellipse area in the bearing and the environment coefficient (contamination degree of lubricant) $a_c$ is determined by the determined value α for the ratio.

BRIEF DESCRIPTION OF THE DRAWINGS

FIG. 7 is an explanatory view showing a screen for a bearing table;

FIG. 14 is an explanatory view showing a screen for the definition of a load coefficient;

FIG. 15 is an explanatory view showing a screen for the explanation of a reliability coefficient;

DETAILED DESCRIPTION OF THE PREFERRED EMBODIMENTS

Preferred embodiments of the present invention are to be described with reference to the drawings.

(1) First Embodiment

First Example of a Life Predicting Device

Figure 1:
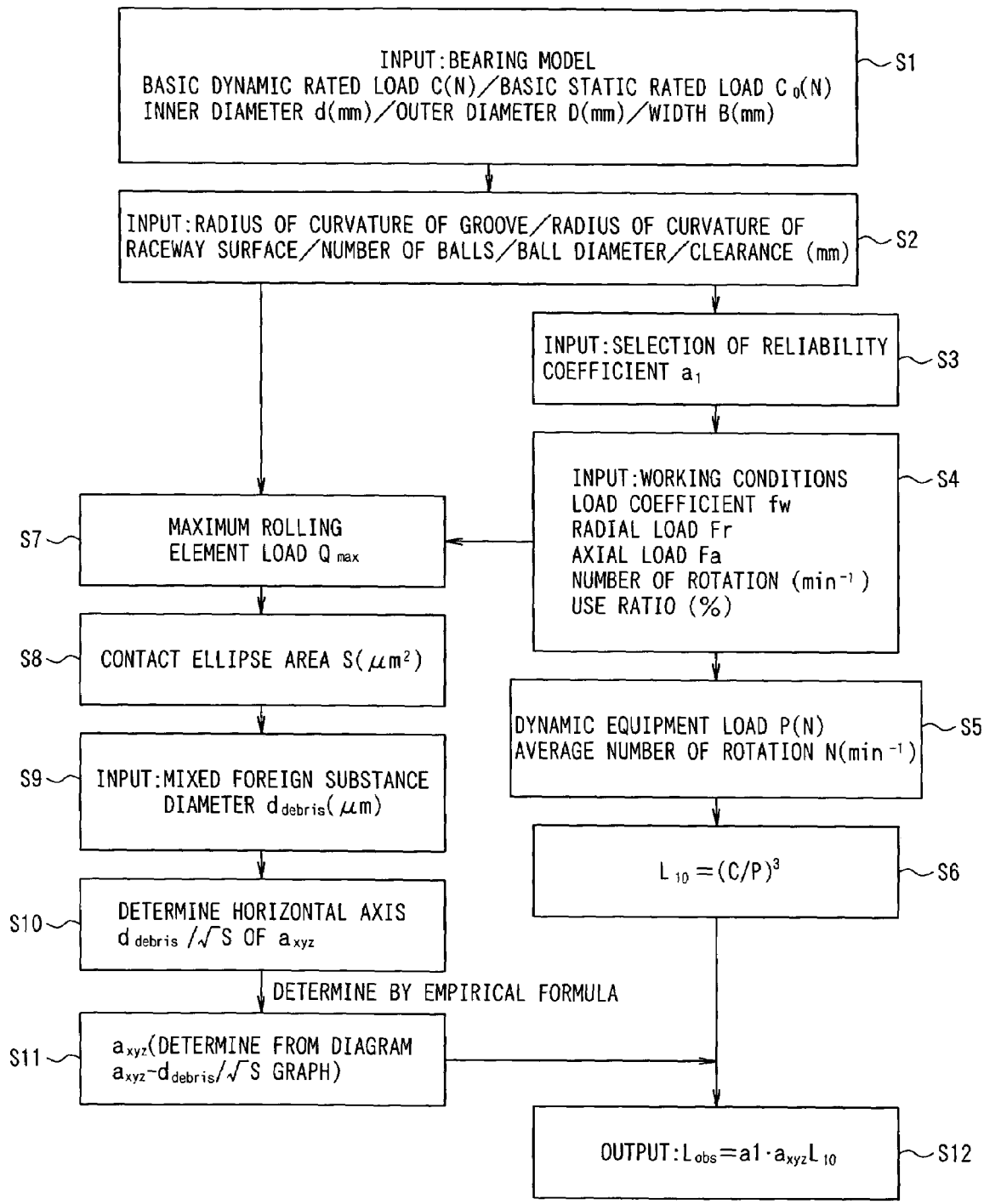
FIG. 1 is a flow chart showing an example of a life predicting method in a life predicting device of a first embodiment according to the present invention.

A life predicting device of a first embodiment is an information processing device for predicting the life of a bearing, for example, by a life predicting application software and it is, for example, a personal computer for predicting the life of a bearing by an application software stored in a memory device. FIG. 1 shows a processing method by the life predicting device.

At first, at step S1, data for the species of a bearing is inputted. Specifically, a basic dynamic rated load C(N), a basic static rated load $C_0$(N), an inner diameter d (mm), an outer diameter D (mm) and a width B (mm) are inputted.

Then, at step S2, other data for the bearing are inputted. Specifically, bearing dimensions such as a radius of curvature of groove, a radius of curvature of starting surface, a number of balls, a ball diameter (mm), and a clearance (mm) are inputted. Then, at step S3, a reliability coefficient $a_1$ is selected from the Table 1 described above. Then, at step S4, data for working conditions of the bearing is inputted. Specifically, a load coefficient $f_w$, a radial load $F_r$, an axial load $F_a$, a number of rotation (min$^{-1}$) and a use ratio (%) are inputted.

Then, at step S5, a dynamic equivalent load P (N) and an average number of rotation N (min$^{-1}$) are determined by properly using the data inputted in the step described above. The dynamic equivalent load is determined as described below.

The dynamic equivalent load P is determined according to the following formula (4) based on the load coefficient $f_w$, the radial load $F_r$ and the axial load $F_a$ inputted at the step S4 and the radial coefficient X and the axial coefficient Y set based on the specification information:

$$P = X \cdot F_r + Y \cdot F_a \qquad (4)$$

The specification table is, for example, the following Table 2.

TABLE 2

| $\dfrac{f_0 F_a}{C_{or}}$ | e | $\dfrac{F_a}{F_r} \leq e$ | | $\dfrac{F_a}{F_r} > e$ | |
|---|---|---|---|---|---|
| | | X | Y | X | Y |
| 0.172 | 0.19 | 1 | 0 | 0.56 | 2.30 |
| 0.345 | 0.22 | 1 | 0 | 0.56 | 1.99 |
| 0.689 | 0.26 | 1 | 0 | 0.56 | 1.71 |
| 1.03 | 0.26 | 1 | 0 | 0.56 | 1.55 |
| 1.38 | 0.30 | 1 | 0 | 0.56 | 1.45 |
| 2.07 | 0.34 | 1 | 0 | 0.56 | 1.31 |
| 3.45 | 0.38 | 1 | 0 | 0.56 | 1.15 |

TABLE 2-continued

| $\dfrac{f_0 F_a}{C_{or}}$ | e | $\dfrac{F_a}{F_r} \leq e$ | | $\dfrac{F_a}{F_r} > e$ | |
|---|---|---|---|---|---|
| | | X | Y | X | Y |
| 5.17 | 0.42 | 1 | 0 | 0.56 | 1.04 |
| 6.89 | 0.44 | 1 | 0 | 0.56 | 1.00 |

According to the Table 2, since the value for $f_0 \cdot F_a / C_{or}$ can be determined if the coefficient $f_0$, the static rated load $C_{or}$, and the axial load $F_a$ can be determined, the radial coefficient X and the axial coefficient Y specified therewith are used. On the other hand, the average number of rotation is a number of rotation used in the life calculation in a case of including plural working conditions, which is an average value for the number of rotations for respective working conditions.

The dynamic equivalent load P and the average number of rotation N are determined as described at step S5, it goes to step S6, and calculates a basic rated life $L_{10}$ of the existent formula by using the formula (1) based on the determined dynamic equivalent load P and the average number of rotation N.

On the other hand, at step S7, it calculate a maximum rolling element load $Q_{max}$ according to the following formula (5) by using the dynamic equivalent load P determined at the step S4.

$$Q_{max} = P / \text{number of balls} \qquad (5)$$

Then, at step S8, it determines a contact ellipse area S ($\mu m^2$). For example, it determines the contact ellipse area S by properly using the data obtained in the step S8 by using the Herz's elastic contact theory. Then, at step S9, it inputs an actually measured mixed foreign substance diameter $d_{debris}$ ("debris" means "foreign substance")($\mu m$).

Then, at step S10, it determines the value for the ratio between the contact ellipse S and the mixed foreign substance diameter $d_{debris}$ obtained at the step S8 and the step S9 ($d_{debris}/\sqrt{S}$, hereinafter referred to as a standardized foreign substance diameter) and, at succeeding step S11, it determines a life correction coefficient $a_{xyz}$ from the standardized foreign substance diameter ($d_{debris}/\sqrt{S}$) In this case, the value $\sqrt{S}$ for the square root of the contact ellipse area S corresponds to a typical dimension for a portion of the bearing in contact with the mixed foreign substance, the mixed foreign substance diameter $d_{debris}$ ($\mu m$) shows the size of the mixed foreign substance and corresponds to a characteristic quantity, and the standardized foreign substance diameter ($d_{debris}/\sqrt{S}$) corresponds to the value α of the ratio.

The life correction coefficient $a_{xyz}$ is determined based on the standardized foreign substance diameter ($d_{debris}/\sqrt{S}$) previously determined according to an empirical formula. The empirical formula is to be explained with reference to examples.

As test bearings, 9 numbers of 6006, 6206, 6306, 6012, 6212, 6312, 6017, 6217, and 6317 by the bearing numbers shown in the following Table 3 are used. Further, a radial load to provide P/C of 0.32 and 0.16 is loaded. The square root ($\sqrt{S}$) for the contact ellipse area S calculated at the step S8 corresponding to the bearing number and two kinds of P/C values (0.32, 0.16) takes each value shown at the right end in Table 3.

TABLE 3

| Bearing Number | Inner diameter d (mm) | Outer diameter D (mm) | Width B (mm) | P/C | Basic dynamic rated load C (kgf) | Radial load Fr (kgf) | $\sqrt{}$ contact ellipse area (μm) |
|---|---|---|---|---|---|---|---|
| 6006 | 30 | 55 | 13 | 0.32 | 1350 | 432 | 1020 |
|  |  |  |  | 0.16 | 1350 | 216 | 823 |
| 6206 | 30 | 62 | 16 | 0.32 | 1980 | 635 | 1352 |
|  |  |  |  | 0.16 | 1980 | 318 | 1084 |
| 6306 | 30 | 72 | 19 | 0.32 | 2700 | 870 | 1663 |
|  |  |  |  | 0.16 | 2700 | 435 | 1334 |
| 6012 | 60 | 95 | 18 | 0.32 | 3000 | 960 | 1234 |
|  |  |  |  | 0.16 | 3000 | 480 | 978 |
| 6212 | 60 | 110 | 22 | 0.32 | 5350 | 1712 | 1902 |
|  |  |  |  | 0.16 | 5350 | 856 | 1509 |
| 6312 | 60 | 130 | 31 | 0.32 | 8350 | 2672 | 2619 |
|  |  |  |  | 0.16 | 8350 | 1336 | 2078 |
| 6017 | 85 | 130 | 22 | 0.32 | 5050 | 1616 | 1572 |
|  |  |  |  | 0.16 | 5050 | 808 | 1248 |
| 6217 | 85 | 150 | 28 | 0.32 | 8550 | 2736 | 2436 |
|  |  |  |  | 0.16 | 8550 | 1368 | 1934 |
| 6317 | 85 | 180 | 41 | 0.32 | 13500 | 4320 | 3408 |
|  |  |  |  | 0.16 | 13500 | 2160 | 2704 |

Further, the experiment is conducted under the following conditions as shown in the following Table 4.

TABLE 4

| Condition | |
|---|---|
| Name of testing machine | Ball bearing life testing machine (manufactured by NSK Ltd.) |
| Test load | P/C = 0.16, 0.32 (2 types) |
| Number of rotation of bearing | N = 2500 rpm |
| Test temperature | 80° C. |
| Lubricant | #68 turbine oil |
| Mixed foreign substance Hardness | HV870, HV500 (2 kinds) |
| Sizes (average foreign substance diameter) | 32(16) μm, 74(53) μm, 147(110.5) μm (3 kinds) |
| Quantity | 150 ppm, 300 ppm (2 kinds) |

As shown in Table 4, the mixed foreign substance is used for two hardnesses (HV 870, HV 500) for three sizes (average foreign substance diameter) of 32 (16) μm, 74 (53) μm, and 147 (110.5) μm and for two amounts (150 ppm, and 300 ppm) in the experiment. Accordingly, experimental results under 24 conditions, (2 (kinds of P/C)×2 (kinds of hardness of foreign substance)×3 (kinds of size of foreign substance)×2 (kinds of quantity of foreign substance)) can be obtained for one bearing number.

The life test was conducted by providing the test bearings each by the number of tens under the conditions (24 kinds of conditions for each bearing number). The test was interrupted when the vibration value for the test bearing on a testing machine reached twice the initial vibration value, and the life was judged by confirming the presence or absence of flaking at the raceway groove surface, and the time the flaking was confirmed was defined as the life.

The test life is defined up to five times of the calculated life of 52%-52% use as groove R specified according to JIS (hereinafter referred to as $L_{cal}$) at the longest and the test is terminated when the longest time is reached. 52% mentioned herein is a groove to diameter ratio of outer and inner rings ($r_e/D_a$, $r_i/D_a$) assuming the diameter of a rolling element as $D_a$ and the groove diameters of the outer ring and the inner rings as $r_e$ and $r_i$.

The actually measured life $L_{exp}$, was determined from a total rotation time till occurrence of flaking in 10% of 10 test specimens from the side of the shorter life according to the Weibull distribution function (that is, 10% life), and the value was used.

Figure 2:
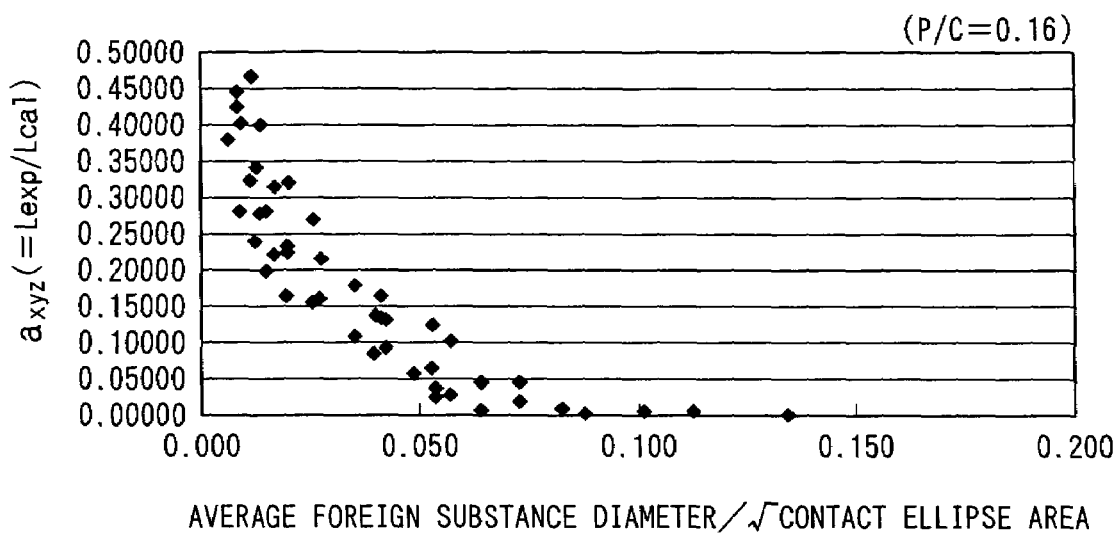
FIG. 2 is a characteristic graph showing the result of an experiment for determining an empirical formula for obtaining a life correction coefficient $a_{xyz}$, for the result at P/C=0.16.
Figure 3:
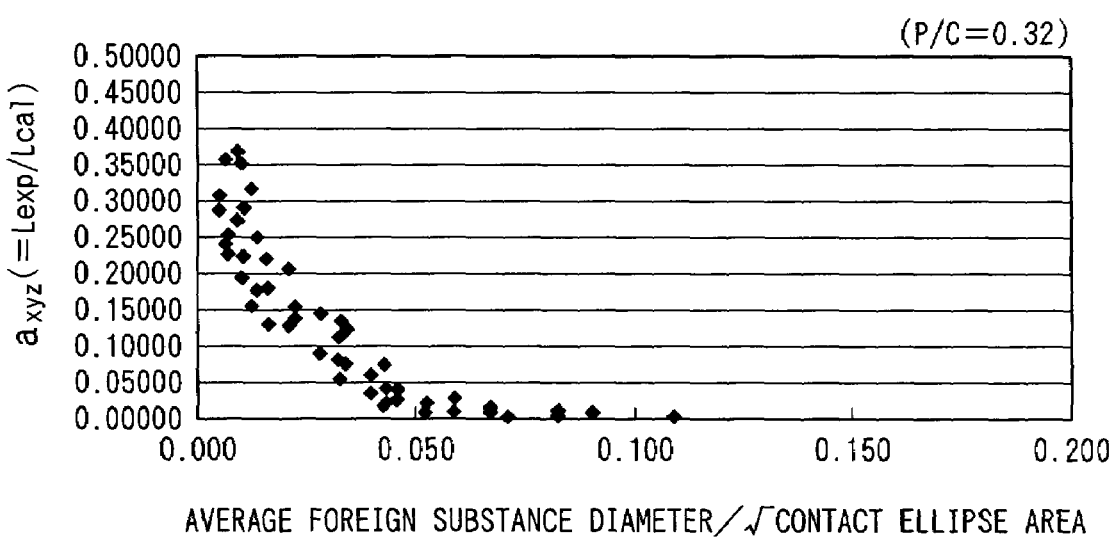
FIG. 3 is a characteristic graph showing the result of an experiment for determining an empirical formula for obtaining a life correction coefficient $a_{xyz}$, for the result at P/C=0.32.

FIG. 2 and FIG. 3 are examples for the result of the life test. In each of the graphs, the abscissa expresses the standardized foreign substance diameter ($d_{debris}/\sqrt{S}$) and the ordinate expresses the life correction coefficient $a_{xyz}$. The value for the life correction coefficient $a_{xyz}$ on the ordinate is a value obtained as a ratio between the actually measured life $L_{exp}$ and the calculation life $L_{cal}$ ($L_{exp}/L_{cal}$) according to the relation of formula (2) assuming the reliability coefficient $a_1$ as 1.

FIG. 2 shows the result of the life test for the test bearings for 9 kinds of bearing numbers (6006, 6206, 6306, 6012, 6212, 6312, 6017, 6217 and 6317) under the conditions at a test load: P/C=0.16, with a hardness of mixed foreign substance of HV 870 and HV 500, the size of foreign substance of 32 (16) μm, 74 (53) μm, and 147 (110.5) μm and the quantity of foreign substance of 150 ppm. The basic rated fatigue life under the conditions is: $L_{10}$=1356.3 (hr).

Further, FIG. 3 shows the result of the life test on the test bearings for 9 kinds of bearing numbers described above under the conditions at a test load: P/C=0.32, with the hardness of mixed foreign substance of HV 870 and HV 500, the size of foreign substance of 32 (16) μm, 74 (53) μm, and 147 (110.5) μm and the quantity of foreign substance of 150 ppm. The basic rated fatigue life under the conditions is: $L_{10}$=169.5 (hr).

Figure 4:
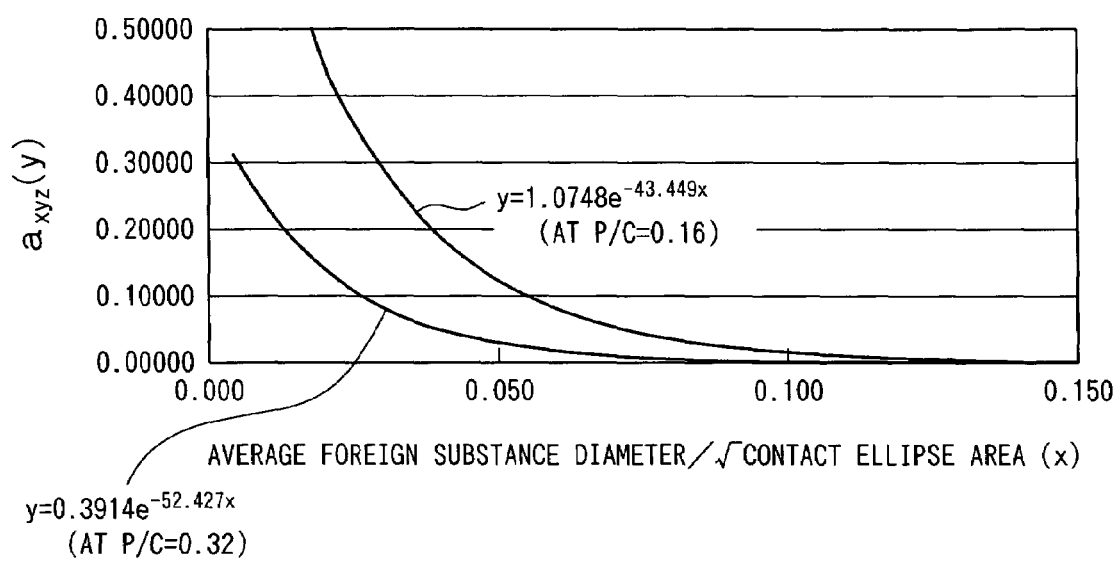
FIG. 4 is a characteristic graph showing values by the empirical formula.

As shown in FIG. 2 and FIG. 3, it can be confirmed that the life correction coefficient $a_{xyz}$ decreases in the manner of an exponential function as the standardized foreign substance diameter ($d_{debris}/\sqrt{S}$) increases. According to plural experimental points described above, approximate formulae (6) and (7) can be obtained for each of the conditions: P/C=0.16, and 0.32 as shown in FIG. 4.

$$y = 1.0748 e^{-43.449 x} \qquad (6)$$

$$y = 0.3914 e^{-52.427 x} \qquad (7)$$

In the formula (6) and formula (7), x corresponds to the standardized foreign substance diameter ($d_{debris}/\sqrt{S}$), and y corresponds to the life correction coefficient $a_{xyz}$). The empirical formula of the following formula (8) is obtained from the formula (6) and the formula (7).

$$a_{xyz}=0.394\{(u/0.16)-1\} \cdot e^{-52.427}t+1.0748\{2-(u/0.16)\} \cdot e^{-43.449}t \quad (8)$$

in which u is a value for the load P/C exerting on the bearing and t is the value $d_{debris}/\sqrt{S}$ described above.

The correction coefficient $a_{xyz}$ is obtained by substituting the value t ($d_{debris}/\sqrt{S}$) and the value e (P/C) as the working conditions in the formula (8) as the empirical formula showing the relation between the standardized foreign substance diameter ($d_{debris}/\sqrt{S}$) and the life correction coefficient $a_{xyz}$.

In the empirical formula, the test load is determined only for the conditions at P/C=0.16 and 0.32, because they are upper and lower limit values of the test load applied usually.

By using the empirical formula described above, the life correction coefficient $a_{xyz}$ is determined from the standardized foreign substance diameter ($d_{debris}/\sqrt{S}$) at step S11.

At the succeeding step S12, a final life $L_{obs}$ (correction rated life $L_{nm}$) is determined by using the basic rated life $L_{10}$ determined at the step S6.

As described above, the correction rated life $L_{nm}$ as the life prediction value can be obtained by the life predicting device.

According to the life predicting device described above, a user can calculate the correction rated life $L_{nm}$ by inputting the bearing type such as the basic dynamic rated load C (N), the basic static rated load $C_0$(N), the inner diameter d (mm), the outer diameter D (mm), and the width B (mm) (step S1), inputting the bearing dimension such as the radius of curvature of groove, radius of curvature of starting surface, the number of balls, the ball diameter (mm), and the clearance (mm), inputting the reliability coefficient ($a_1$) selected with reference to Table 1 (step S3), inputting the data for the bearing working conditions such as the load coefficient ($f_w$), the radial load $F_r$, the axial load $F_a$, the number of rotation (min$^{-1}$) and the use ratio (%) the step S4 and then inputting the actually measured mixed foreign substance diameter $d_{debris}$ measured, for example, by a particle measuring instrument (step S9), by using the life predicting device based on the inputted data described above.

Then, in the life predicting device, since the life correction coefficient $a_{xyz}$ is determined by the empirical formula used in the step S11 described above while taking the characteristic quantity showing the size of the foreign substance into consideration, the life prediction obtained based on the life correction coefficient $a_{xyz}$ is determined properly while reflecting the characteristic of the mixed foreign substance.

Accordingly, since the quantitative evaluation is made while considering the size and the shape of the mixed foreign substance by the life correction coefficient $a_{xyz}$, the life predicting device can provide the bearing life obtained according to the formula (2) above as predicted at a high accuracy.

In the processings described above, the processings at the step S1, the step S2, and the step S4 correspond to the specification information inputting means, the processing at the step S3 corresponds to the reliability setting means, the processing at the step S5 corresponds to the dynamic equivalent load computation means, the processings at the step S7 and the step S8 correspond to the typical dimension determining means, the processing at the step S9 corresponds to the mixed foreign substance characteristic quantity inputting means, the step S10 corresponds to the ratio computation means, the processing at the step S11 corresponds to the life correction coefficient setting means, and the processings at the step S6 and the step S12 correspond to the bearing life computation means.

(2) Second Embodiment

Second Example of a Life Predicting Device

Then, a life predicting device of a second embodiment is to be described.

Figure 5:
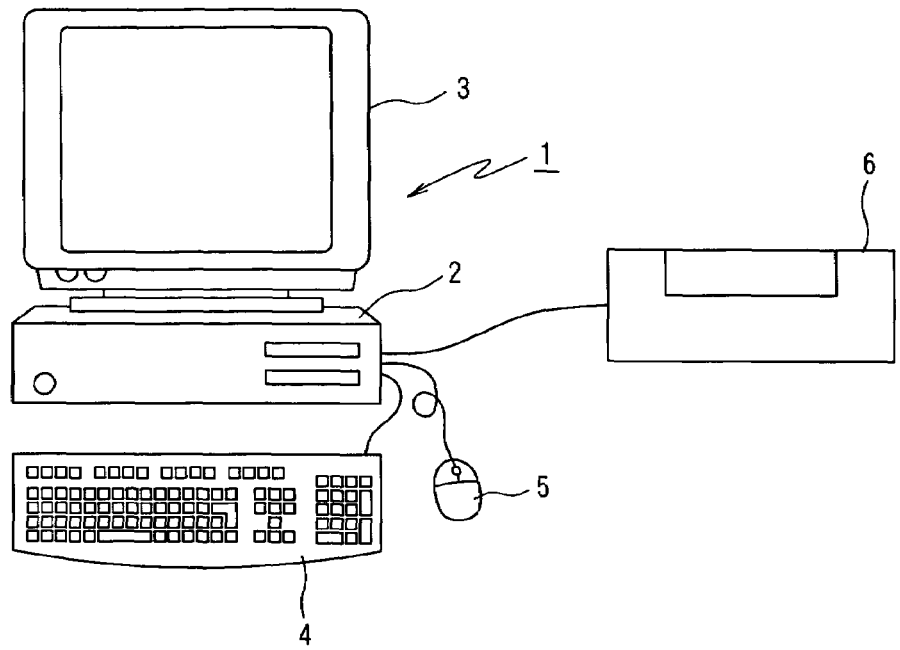
FIG. 5 is a view showing the constitution of a life predicting device of a second embodiment.

A life predicting device of the second embodiment is, as shown in FIG. 5, a personal computer 1 comprising a computer main body 2, a display 3 which is a liquid crystal display or a CRT connected therewith, a key board 4, a mouse 5 and a printer 6 connected with the computer main body 2.

Figure 6:
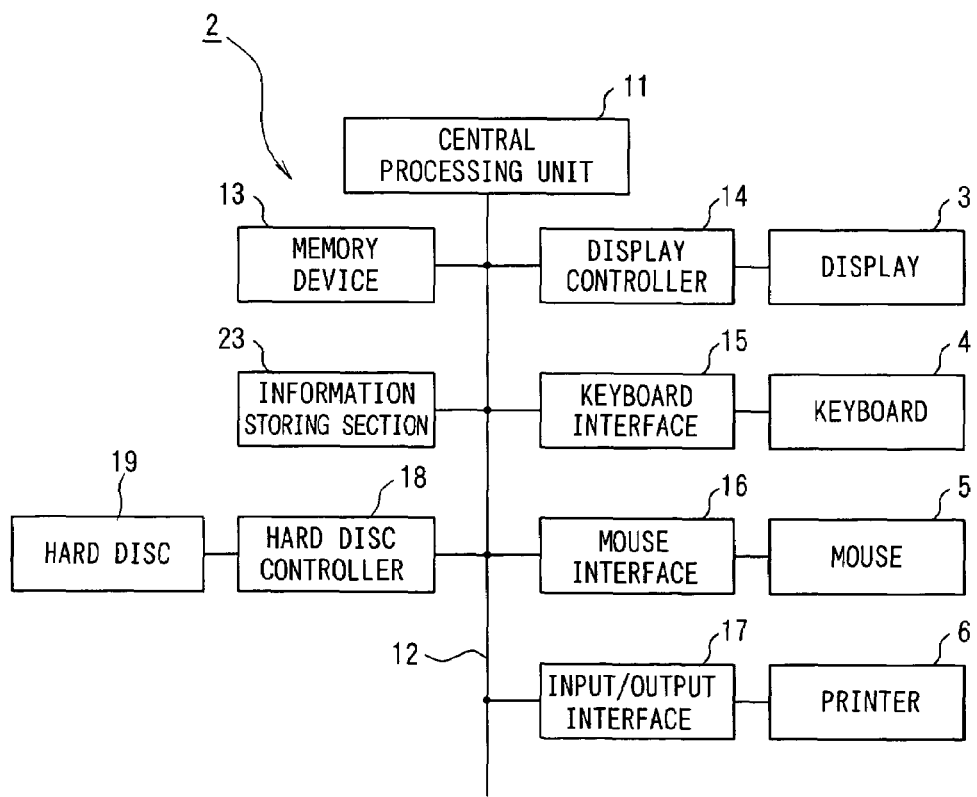
FIG. 6 is a block diagram showing an electrical connection relation in the life predicting device of the second embodiment.

The internal circuit of the computer main body 2, as shown in FIG. 6, comprises a central processing unit 11, a memory device 13 such as ROM and RAM connected to the central processing unit 11 by way of a system bus 12, a display controller 14 for connecting the display 3 to the system bus 12, a key board interface 15 for connecting the key board 4 to the system bus 12, a mouse interface 16 for connecting the mouse 5 to the system bus 12, an input/output interface 17 for connecting the printer 6 to the system bus 12, and a hard disk 19 connected by way of a hard disk controller 18 to the system bus 12.

In this case, an operating system is accommodated in the hard disk 19, and a life predicting application software for predicting the life of a rolling bearing and an electronic catalog storing the specification information of rolling bearings are also accommodated.

Further, as shown in FIG. 7, the electronic catalog stores specification information such as bearing species, bearing number, main dimension, and basic dynamic rated load C. The electronic catalog may also further store information such as a basic static rated load $C_0$, a coefficient $f_0$, an allowable number of rotation, a radial coefficient X and an axial coefficient Y. In this case, the basic static load coefficient $C_0$, the coefficient $f_0$, the allowable number of rotation, the radial coefficient X and the axial coefficient Y can be seen by scrolling the screen by the manipulation to the mouse 5 and the like.

Further, the life predicting application software executes predetermined computation based on the input specification information by utilizing the table calculation application software to conduct life predicting processing of a rolling bearing.

Figure 8:
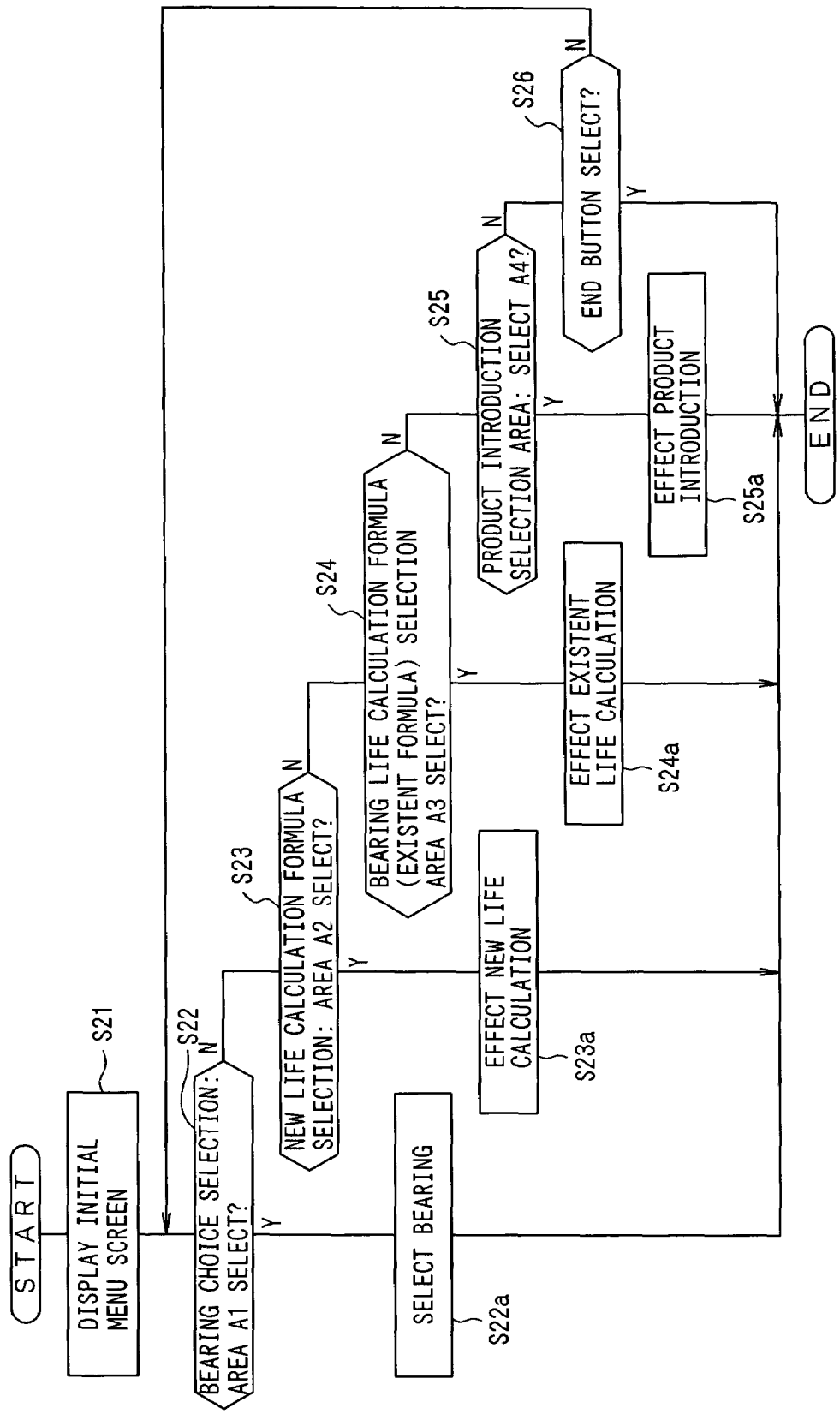
FIG. 8 is a flow chart showing an example of a life predicting method.

In the life predicting processing, as shown in FIG. 8, an initial menu screen is displayed at first at step S21.

Figure 9:
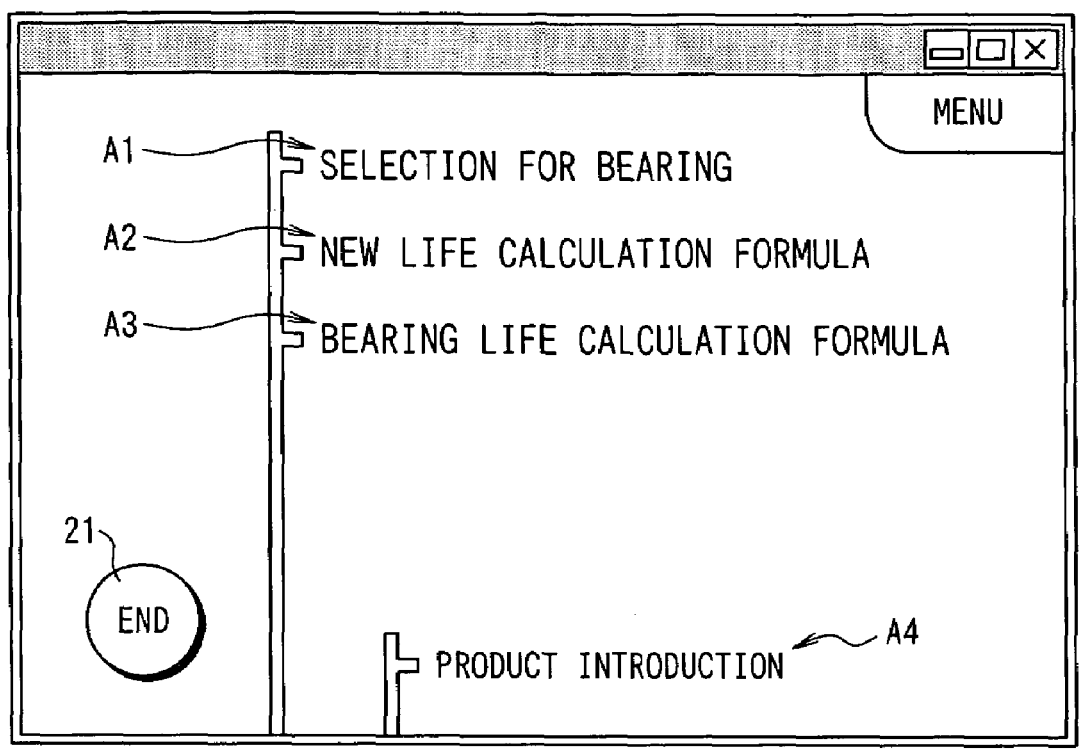
FIG. 9 is an explanatory view showing an initial menu screen.

The initial menu screen displays, as shown in FIG. 9, functions stored in the application software selectably, which displays a bearing choice selection area A1, a new life calculation formula selection area A2, a bearing life calculation formula (existent formula) selection area A3, a product introduction selection area A4, and an end button 21.

Then, it goes to step S22, and judges whether the bearing choice selection area A1 is selected or not by the mouse 5 or the key board 4. In a case it is selected, it goes to step S22a, executes the bearing selection processing to be described later and then ends the processing. In a case the bearing choice selection area A1 is not selected, it goes to step S23.

At step S23, it judges whether the new life calculation formula selection area A2 is selected or not and, if it is selected, it goes to step S23a, executes a new life calculation processing described later and then ends the processing. If the new life calculation formula selection area A2 is not selected, it goes to step S24.

At step S24, it judges whether the bearing life calculation formula (existent formula) selection area A3 is selected or not by the mouse 5 or the key board. In a case where it is selected, it goes to step S24a, calculates the bearing life $L_{10}$ by the existent formula in accordance with the formula (1) described above and then ends the processing. If the bearing life calculation formula (existent formula) selection area A3 is not selected, it goes to step S25.

At step S25, it judges whether the product introduction selection area A4 is selected or not by the mouse 5 or the keyboard 4. If it is selected, it goes to step S25a, executes the product introduction processing of displaying the product introduction information previously stored in the hard disk 19 on the display 3 and then ends the processing. If the product introduction selection area A4 is not selected, it goes to step S26.

At step S26, it judges whether the end button 21 is selected or not by the mouse 5 or the key board 4 or not and, if the end button 21 is selected, it ends the life predicting processing as it is. If the end button 21 is not selected, it returns to the step S22.

Figure 10:
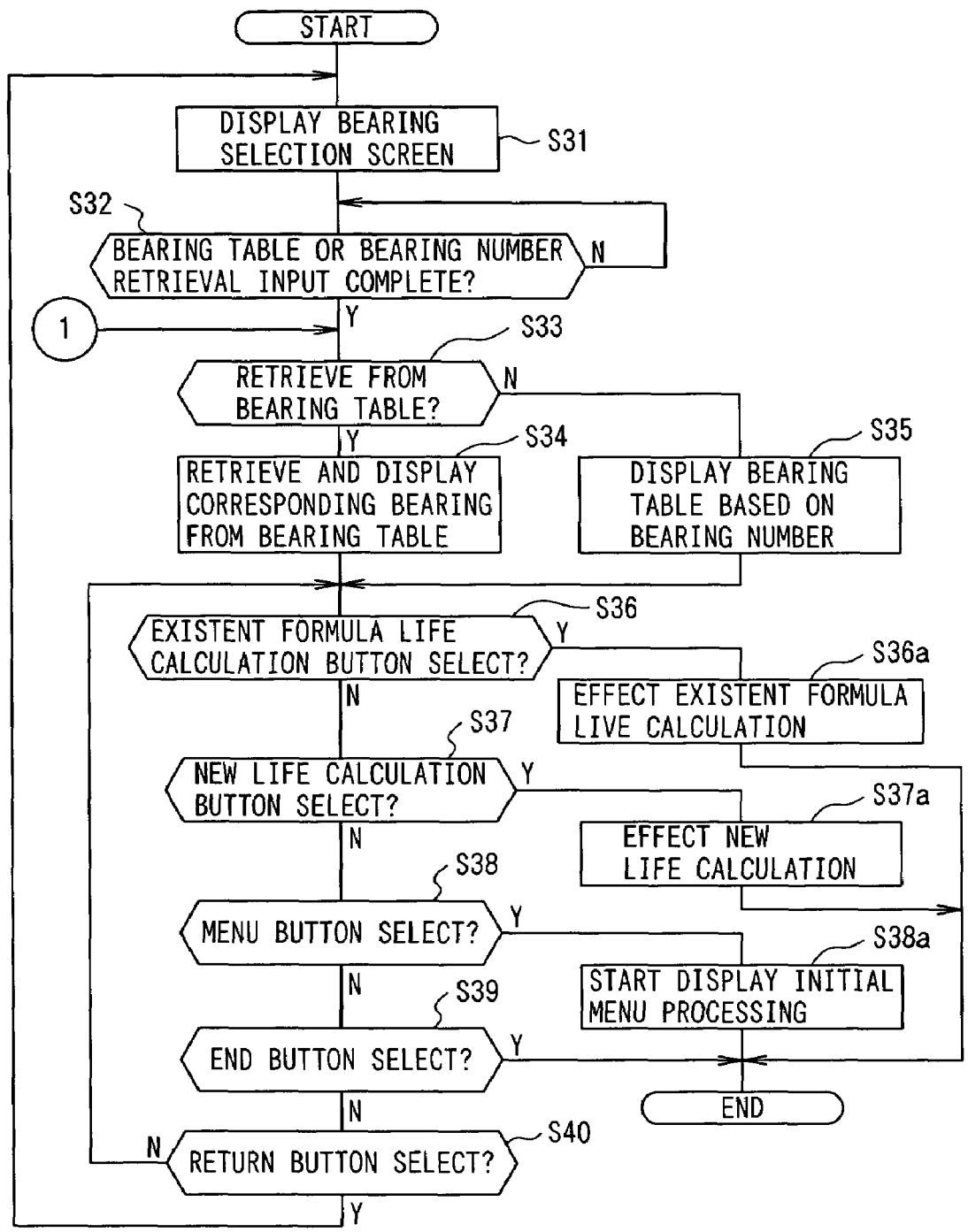
FIG. 10 is a flow chart showing an example of a bearing selection processing method.
Figure 11:
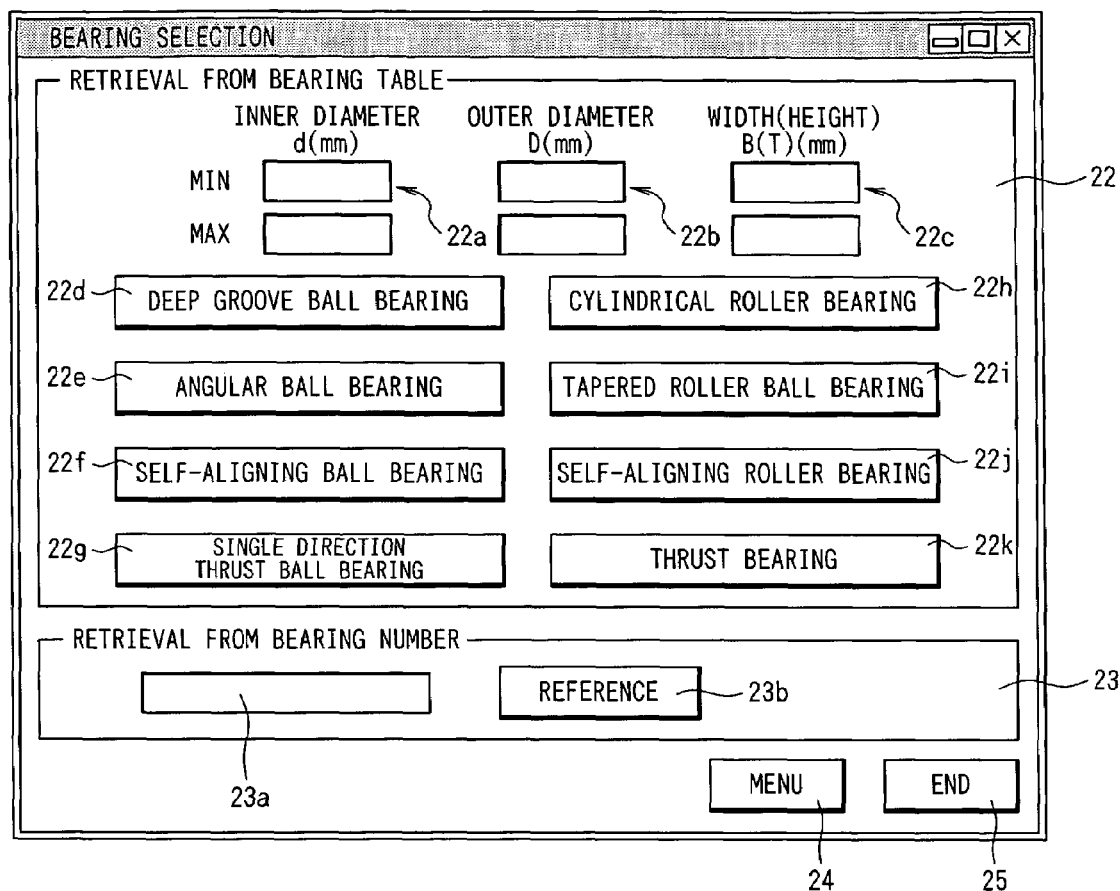
FIG. 11 is an explanatory view for a bearing selection screen.

In the bearing selection processing at step S22a, as shown in FIG. 10, it at first displays at step S31 a bearing selection screen shown in FIG. 11 on the display 3.

The selection screen displays, as shown in FIG. 11 displays a retrieve area 22 retrieving from a bearing table, a retrieve area 23 retrieving from the bearing number, a menu button 24 for displaying the inputted specification information of the rolling bearing and an end button 24. The retrieve area 22 displays text input areas 22a to 22c for inputting minimum values and maximum values of the inner diameter d, the outer diameter D, and the width (height) B (T), a deep groove ball bearing selection button 22d, an angular ball bearing selection button 22e, s self-aligning ball bearing selection button 22f, a single direction thrust ball bearing selection button 22g, a cylindrical roller bearing selection button 22h, a tapered roller bearing selection button 22i, a self-aligning roller bearing selection button 22j and a thrust roller bearing selection button 22k for selecting bearing species. Further, the retrieve area 23 displays a text input box 23a for inputting the bearing number and a reference button 23b displaying a list of bearing numbers.

Then, it goes to step S32 and judges whether the input for the inner diameter d, the outer diameter D, and the width (height) B (T) has been completed and selection for the bearing type has been ended or not in the case of retrieving from the bearing table, or whether the input of the bearing number has been ended or not in the case of retrieving from the bearing number and waits for the end of the input if one of them has not yet been ended till the end of the input. If the input has been ended, it goes to step S33 and judges whether this is the retrieval from the bearing table or not and, if it is retrieved from the bearing table, it goes to step S34, retrieves the electronic catalog based on the inner diameter d, the outer diameter D, the width (height) B (T), and the bearing species, displays the bearing table screen shown in FIG. 7 for displaying the corresponding specification information and then goes to step S36. If retrieval is selected from the bearing number, it goes to step S35, retrieves the electronic catalog based on the bearing number inputted to the text input box 23a, displays the bearing table screw shown in FIG. 7 for displaying the corresponding specification information and then goes to step S36.

In this case, the bearing table screen displays, as shown in FIG. 7, a specification information display area 31 for displaying the corresponding specification information of the electronic catalog, an existent formula life calculate button 32, a new life calculate button 33 according to the invention, a return button 33, a menu button 36, and an end button 37.

At step S36, it selects a desired bearing number and then judges whether the existent formula life calculate button 32 is selected or not and, if the existent life calculate button 32 is selected, it goes to step S36a, conducts computation of the formula (1) to execute the existent formula life calculation processing of calculating the basic rated life $L_{10}$ and then ends the processing. In a case if the existent life calculate button 32 is not selected, it goes to step S37.

At step S37, it selects a desired bearing number, then judges whether the new life calculate button 33 is selected or not and, if the new life calculate button 33 is selected, it goes to step S37b, conducts new life calculation processing to be described later and ends the processing. In a case if the new life calculate button 33 is not selected, it goes to step S38.

At step S38, it judges whether the menu button 36 is selected or not and, if the menu button 36 is selected, it goes to step S38a, actuates the initial menu display processing shown in FIG. 8 and then ends the processing. In a case if the menu button 36 is not selected, it goes to step S39.

At step S39, it judges whether the end button 37 is selected or not and, if the button is selected, it ends the life calculation processing as it is. In a case if the end button 37 is not selected, it goes to step S40 and judges whether the return button 35 is selected or not and, if the button is selected, it returns to the step S31. In a case if the return button 35 is not selected, it returns to the step S36.

Figure 12:
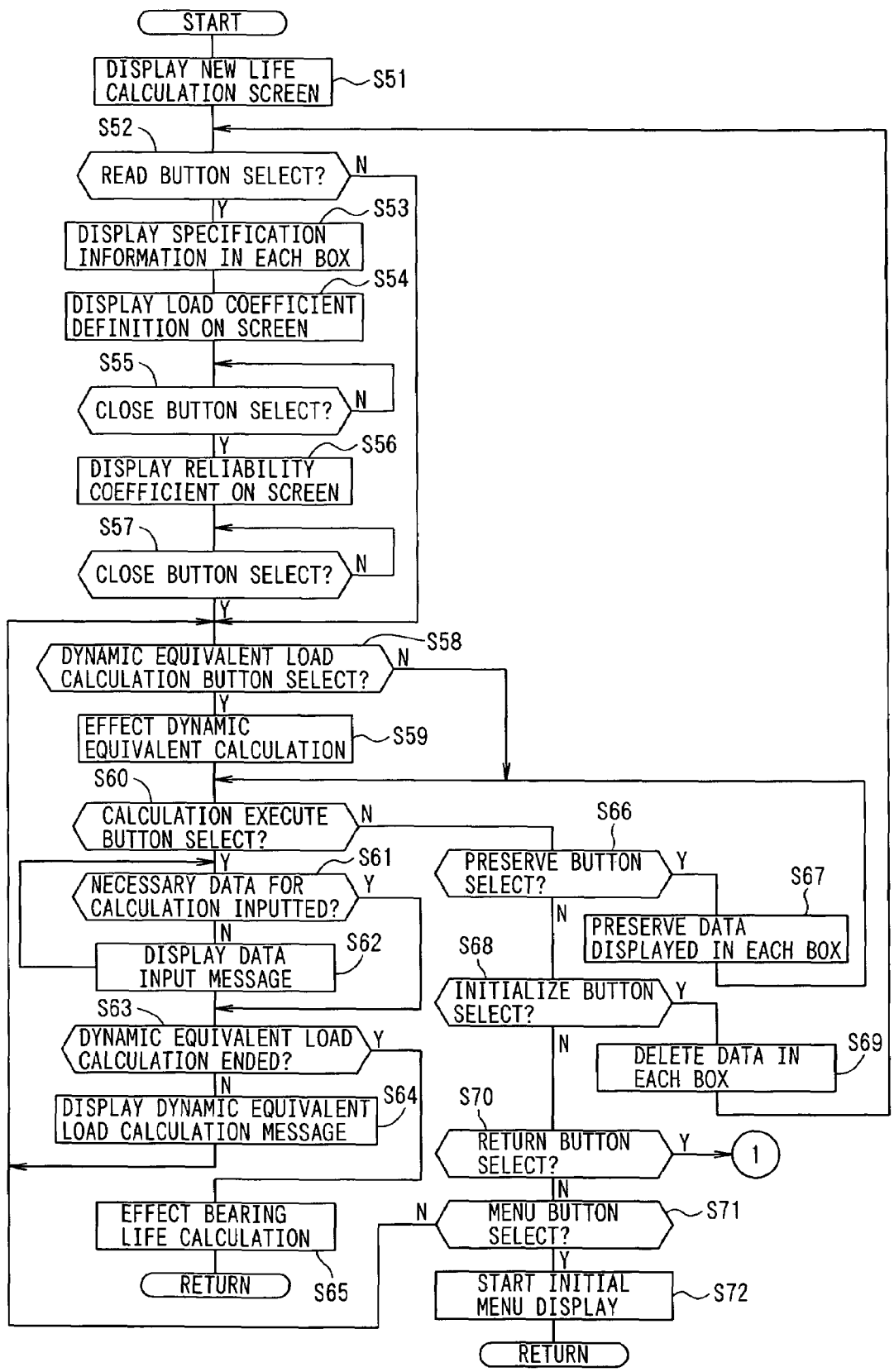
FIG. 12 is a flow chart showing an example of a new life calculation processing method.
Figure 13:
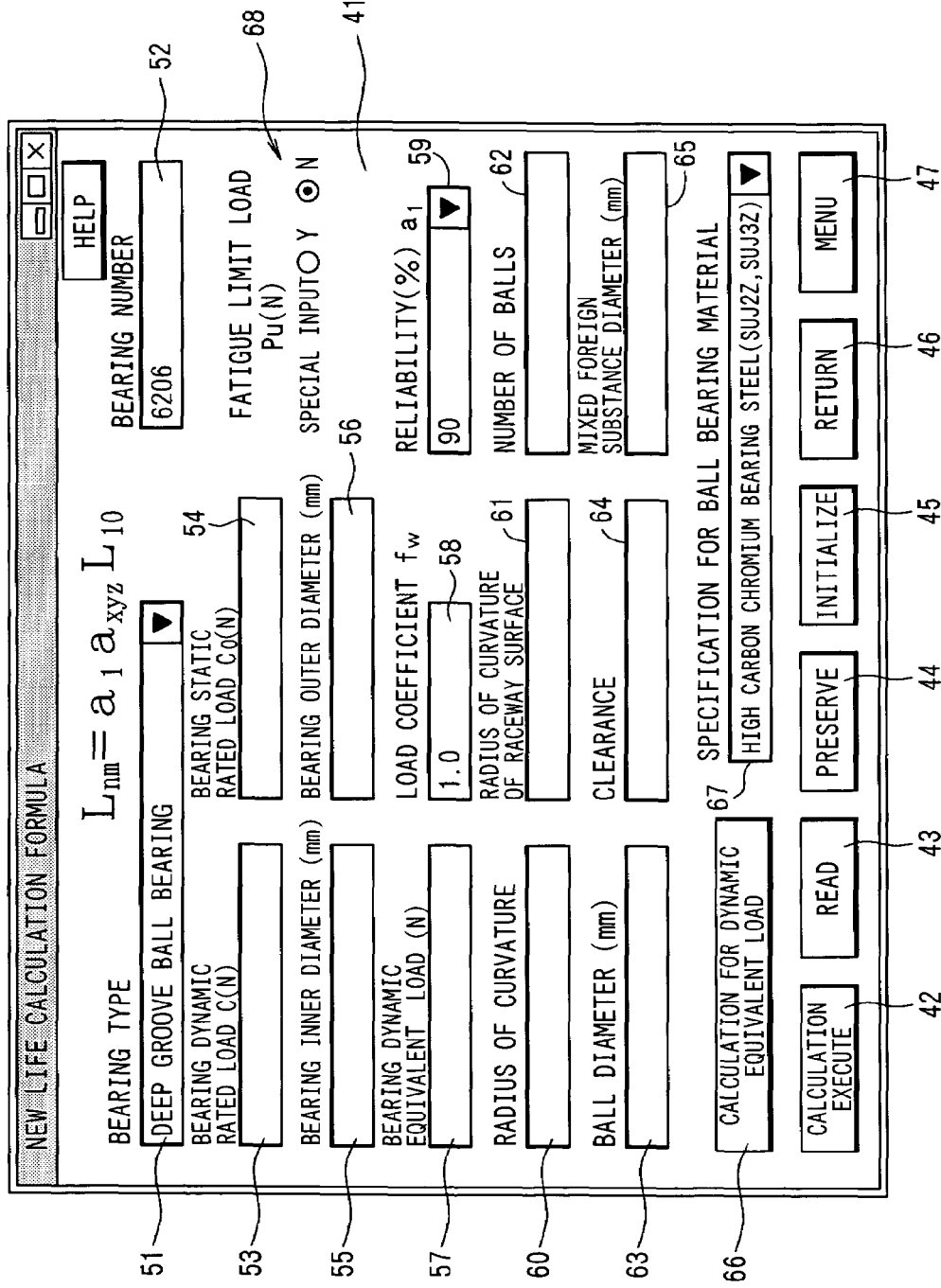
FIG. 13 is an explanatory view showing a screen for new life calculation formula.

In the new life calculation processing at the steps S23a and S37a, it at first displays at step S51, as shown in FIG. 12, displays a new life calculation screen shown in FIG. 13.

Further, the new life calculation screen has a display area 41 for displaying predetermined items, and a calculation execute button 42, a read button 43, a preserve button 44, an initialize button 45, a return button 46 and a menu button 47 arranged below the display area 41.

In this case, the display area 41 displays the life calculation formula of the formula (2) in a heading portion, and has a combo box 51 for selecting the bearing type, a text box 52 for inputting the bearing number, a text box 53 for inputting a bearing dynamic rated load C, a text box 54 for inputting a bearing static rated load $C_0$, a text box 55 for inputting a bearing inner diameter d, a text box 56 for inputting a bearing outer diameter D, a text box 57 for displaying a bearing dynamic equivalent load P, a text box 57 for inputting a load coefficient $f_w$, a combo box 59 for selecting a reliability coefficient $a_1$, a dynamic equivalent load calculate button 60 for indicating the calculation of the dynamic equivalent load, a text box 60 for inputting the radius of curvature of groove, a text box 61 for inputting the radius of curvature of raceway surface, a text box 62 for inputting the number of balls, the text box 63 for inputting the ball diameter, a text box 64 for inputting the clearance, a text box 65 for inputting the mixed foreign substance diameter, a dynamic equivalent load calculate button 66, a combo box 67 for selecting the specification of the bearing material, and a select button 68 for selecting the absence or presence of a particular input for the fatigue limit load Pu. Then, the text box 58 for the load coefficient $f_w$ displays "1.0", the combo box 59 for the reliability coefficient $a_1$ displays "90", and the combo box 67 for the specification of the bearing material displays "high carbon chromium bearing steel (SUJ2Z, SUJ3Z)" as default values.

Then, it goes to step S52 and judges whether the read button 43 is selected or not and directly goes to step S58 if the button is not selected. In a case where the read button 43 is selected, it goes to step S58 and successively displays the specification information for the rolling bearing of the bearing number selected in the bearing table of FIG. 7 in the order of the combo box 51 and the text box 52. When it displays the bearing outer diameter D in the text box 56, it goes to step S54 and displays the screen for the definition of the load coefficient having a display area 61 for displaying the description for the definition of the load constant and a close button 62 shown in FIG. 14. Then, it goes to step S55, and judges whether the close button 62 is selected or not and, if the button is not selected, it waits till the selection and goes to step S56 when it is selected.

Then, at step S56, it displays a screen for the explanation of the reliability coefficient having a display area 63 for displaying a sentence for the reliability coefficient and a close button 64 shown in FIG. 15, then goes to step S57 and judges whether the close button 64 is selected or not. In a case if the button is not selected, it waits till selection and, if the close button 64 is selected, it goes to step S58.

At step S58, it judges whether the dynamic equivalent load calculate button 66 is selected or not and, if it is selected, it goes to step S59, conducts the dynamic equivalent load calculation described later and then goes to step S60. In a case if the dynamic equivalent load calculate button 66 is not selected, it goes to step S60 as it is.

At step S60, it judges whether the calculate execute button 42 is selected or not and, if the calculate execute button 42 is selected, it goes to step S61 and judges whether the data necessary for calculation has already been inputted or not. The data necessary for the calculation is the data to be inputted to the text box displayed in the display area 41 described above, which is the data necessary for determining the correction rated life $L_{nm}$.

If not all the data necessary for the calculation are inputted, it goes to step S62, displays message information for promoting the completion of the input of the data necessary for the calculation and then returns to the step S61 and stays in a data input waiting state. On the other hand, when all the data necessary for the calculation have been inputted, it goes to step S63.

At step S63, it judges whether the calculation for the dynamic equivalent load P is ended or not and, if it is not ended, it goes to step S64, displays message information for promoting the precedent completion for the calculation of the dynamic equivalent load P precedingly, and then returns to the step S58. If the calculation for the dynamic equivalent load P is completed, it goes to step S65 and computes the formula (2) to conduct life calculation processing for calculating the correction rated life That is, it determines the maximum rolling element load $Q_{max}$ based on the formula (5) from the dynamic equivalent P determined at the step S59 (processing at step S7 shown in FIG. 1) and successively determines the contact ellipse area S ($\mu m^2$) (processing at step S8 shown in FIG. 1). Then, it calculates the standardized foreign substance diameter ($d_{debris}/\sqrt{S}$) based on the contact ellipse area S ($\mu m^2$) and the mixed foreign substance diameter ($d_{debris}$) inputted to the text box 65, and calculates the life correction coefficient $a_{xyz}$ based on the formula (8) as the previously obtained empirical formula (8). On the other hand, it calculates the basic rated life $L_{10}$ based on the formula (1) from the dynamic equivalent load P. Then, it calculates the correction rated life $L_{nm}$ according to the formula (2) based on the calculated life correction coefficient $a_{xyz}$ and the basic rated life $L_{10}$.

After conducting the life calculation processing of calculating the correction rated life $L_{nm}$, it ends the processing and goes to step S60 in a case if the result of judgment at the step S60 showing that the calculation execute button 42 is not selected, it goes to step S66 and judges whether the preserve button 44 is selected or not. In a case if the preserve button 44 is selected, it goes to step S67 and preserves data displayed on each boxes 51 to 65 at that instance and then returns to the step S60. In a case if the preserve button 40 is not selected, it goes to step S68.

At step S68, it judges whether the initialize button 45 is selected or not and, if the initialize button 45 is selected, it goes to S69, deletes the displayed data and then returns to the step S52. In a case if the initialize button 45 is not selected, it goes to step S70 and judges whether the return button 46 is selected or not. In a case if the return button 46 is selected, it returns to step S33 in the bearing selection processing in FIG. 10. In a case where the return button 46 is not selected, it goes to step S71 and judges where the menu button 40 is selected or not. In a case if the menu button 47 is selected, it goes to step S72, starts the initial menu display processing and ends the processing. In a case if the menu button 47 is not selected, it returns to the step S58.

Figure 16:
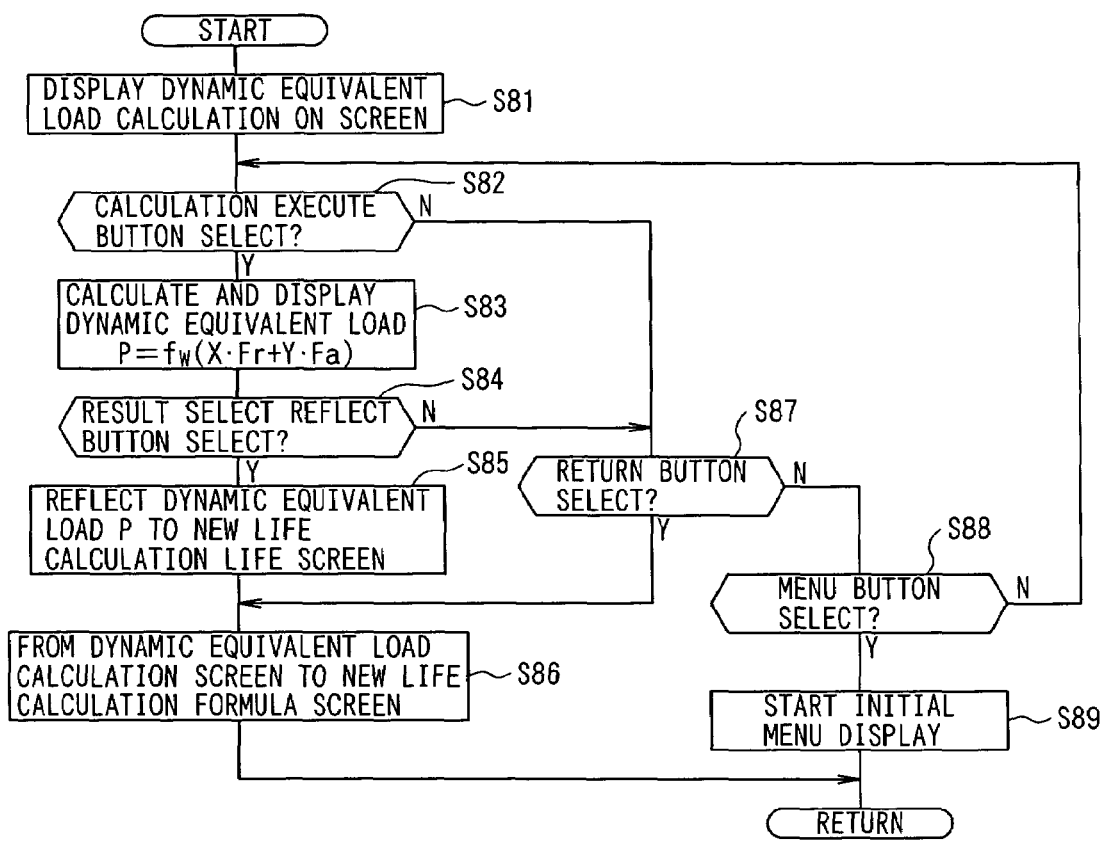
FIG. 16 is a flow chart showing an example of a dynamic equivalent load calculation processing method.
Figure 17:
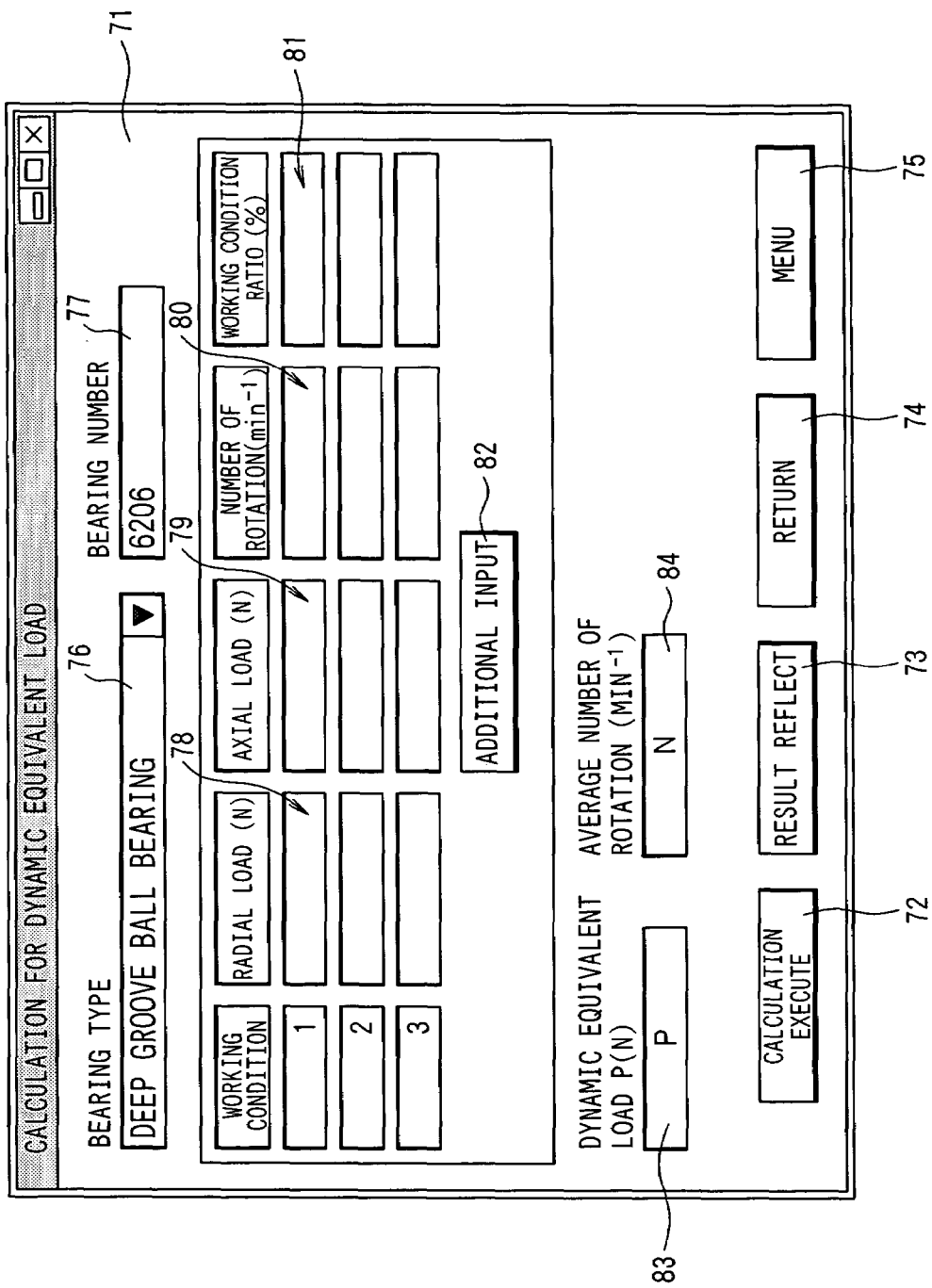
FIG. 17 is an explanatory view showing a screen for a dynamic equivalent load.

The dynamic equivalent load calculation processing executed at the step S59 by the selection of the dynamic equivalent calculate button 66 at the step 58 displays, specifically, as shown in FIG. 16, a dynamic equivalent load calculation screen shown in FIG. 17 at first at step S81.

The dynamic equivalent load calculation screen has a display area 71 for indicating predetermined items and a calculation execute button 72, a result reflect button 73, a return button 74 and a menu button 75 displayed below the display area 71.

The display area 71 has a combo box 76 for selectively displaying the bearing type, a text box 77 for displaying the bearing number, a text box 78 for inputting the radial load fr of working condition, a text box 79 for inputting an axial load fa, a text box 80 for inputting the number of rotation, a text box 81 for inputting the use condition ratio, an additional input button 82, a text box 83 for displaying the dynamic equivalent load P and a text box 84 displaying the average number of rotation N.

Then, it goes to step S82, judges whether the calculation execute button 72 is selected or not and, in a case if the calculation execute button 72 is selected, it goes to step S83, calculates the dynamic equivalent P by computing the formula (4) based on the radial load $F_r$ and the axial load $F_a$ inputted to the text boxes 78 and 79, the radial coefficient X and the axial coefficient Y set by the specification information, and the load coefficient $f_w$ set on the new life calculation screen in FIG. 13, displays the calculated dynamic equivalent load P on the text box 83 and then goes to step S84.

At step S84, it judges whether the result reflect button 73 is selected or not and, in a case if the result reflect button 73 is selected, it goes to step S85, reflects the calculated dynamic equivalent load P in the text box 57 for the dynamic equivalent load in the new life calculation formula screen in FIG. 13, then goes to step S86, closes the dynamic equivalent load calculation screen in FIG. 17, actuating the new life calculation screen in FIG. 13 and then ends the processing.

Further, in a case if the calculation execute button 72 is selected at step S82, and if the result reflect button 73 is not selected at the step S84, it goes to step S87 and judges whether the return button 74 is selected or not. In a case if the return button 70 is selected, it goes to step S86, redisplays the new life calculation screen of FIG. 13 and ends the processing. In a case if the return button 74 is not selected, it goes to step S88 and judges whether the menu button 75 is selected or not. In a case if the menu button 75 is selected, it goes to step S89, activates the initial menu display processing the FIG. 8 and then ends the processing. In a case if the menu button 75 is not selected, it returns to the step S82.

Figure 18:
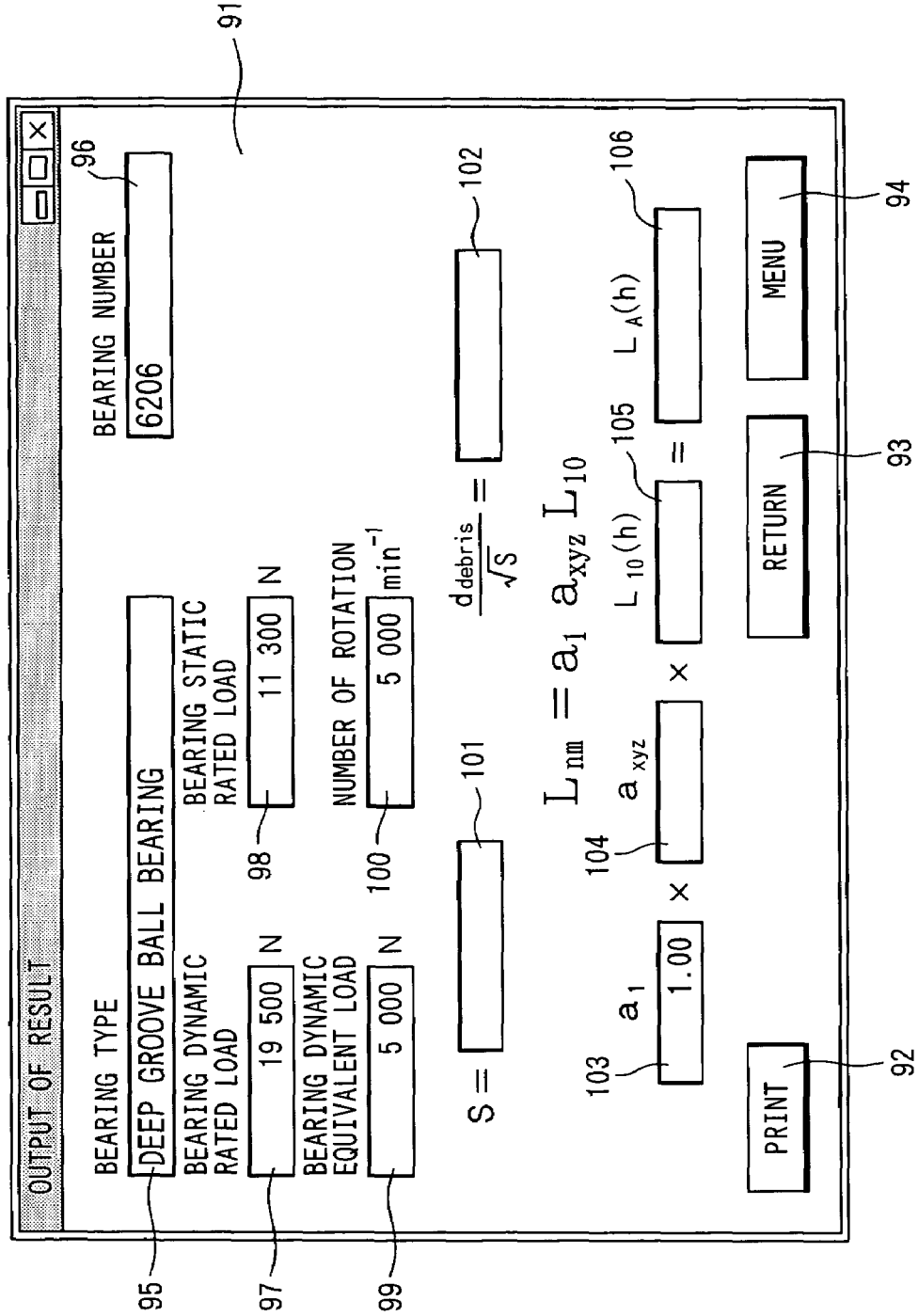
FIG. 18 is an explanatory view showing a screen for result output.

The result of various calculations determined at the step S65 are displayed as the result output screen shown in FIG. 18.

The result output screen has a display area 91 for displaying predetermined items, and a print button 92, a return button 93 and menu button 94 arranged below the display area 91. The display area 91 comprises a text box 95 for displaying a bearing type, a text box 96 for displaying the bearing number, a text box 97 for displaying the bearing dynamic rated load, a text box 98 for displaying the bearing static rated load, a text box 99 for displaying the bearing dynamic equivalent load, a text box 100 for displaying the number of rotation, a text box 101 for displaying the contact ellipse area S, a text box 102 for displaying the standardized foreign substance diameter ($d_{debris}/\sqrt{S}$), a text box 103 for displaying the reliability coefficient $a_1$, a text box 104 for displaying a life correction coefficient $a_{xyz}$, a text box 105 for displaying the basic rated life $L_{10}$ and a text box 106 for displaying the correction rated life $L_{nm}$ of the rolling bearing.

The shows processings attained by the life predicting device of the second embodiment. The following processings are conducted by a user's operations.

Now assuming that the life of a deep groove ball bearing having, for example, a bearing number of "6206" is to be predicted. At first, a power source for the computer main body is turned on to actuate the operating system and then the life predicting application software is started.

Thus, execution for the life predicting processing for the rolling bearing shown in FIG. 8 is started, and the initial menu screen shown in FIG. 9 is at first displayed. In the initial menu screen, when the selection area A1 for the choice of bearing is clicked, for example, by the mouse 5, the screen for the selection of the bearing shown in FIG. 11 is displayed. In a case where the bearing is retrieved from the bearing table, at least each of the text boxes 22a, 22b, and 22c for the inner diameter, the outer diameter and the width are selected successively by the mouse 5, the desired dimensions "30", "62", and "16" each by the milli unit are inputted from the key board 4, and the deep groove ball bearing select button 22d is selected.

Thus, the electronic catalog is retrieved and the specification information such as main dimensions d, D, B, r, and basic dynamic rated load C (also including the basic static rated load $C_0$, the coefficient $f_0$, the allowable number of rotation, the radial coefficient X, and the axial coefficient Y although not illustrated) for the corresponding bearing number "6206" are displayed in outlined characters on the bearing table screen in FIG. 7. Further, also in a case of directly inputting the bearing number "6206", the bearing table screen of FIG. 7 is also displayed.

In the bearing table screen, when the new calculate button 33 is selected by clicking the mouse 5, the new life calculation formula screen of FIG. 13 is displayed and, when the read button 43 is clicked on the new life calculation formula screen, specification information for the bearing number selected in the bearing table of FIG. 7 are inputted successively. That is, "deep groove ball bearing" is displayed as the bearing type in the combo box 51, "6206" is displayed in the text box 52 for bearing number, "1980" is displayed in the text box 53 for bearing dynamic rated load C, "30" is displayed in the text box 55 for the bearing inner diameter d, and "62" is displayed in the text box 56 for the bearing outer diameter D.

Then, the definition screen for the load constant shown in FIG. 14 is displayed above the new life calculation screen, and the load coefficient $f_w$ is determined from the operation condition or the place for use with reference to the definition screen. In this example, the load coefficient $f_w$ is defined to "1.0" as a default value so as to be used for example in electromotive machines, machine tools or air conditioning machines in a smooth operation with no impact shocks.

Then, when the close button 62 is selected, the definition screen for the load coefficient is closed and, instead, the explanatory screen for the reliability coefficient shown in FIG. 15 is displayed, and the reliability coefficient $a_1$ is determined with reference to the explanatory screen for the reliability coefficient. In this example, "100" is determined as the reliability coefficient $a_1$ by determining the reliability to 90% as the default value.

Then, when the close button 64 is selected by the mouse 5, the explanatory screen for the reliability coefficient is closed to actuate the new life calculation screen. In this case, necessary information such as determined load coefficient $f_w$, reliability coefficient $a_1$, radius of curvature for groove, radius of curvature for raceway surface, number of balls, ball diameter, clearance, and mixed foreign substance diameter are inputted to the text box 58 to text box 64 respectively by using the key board 4. Since the default values are used for the values of the load coefficient $f_2$, and the reliability coefficient $a_1$ in this example, inputting is saved.

In this state, when the dynamic equivalent load calculate button 66 is selected by the mouse 5, the dynamic equivalent 6 calculation screw shown in FIG. 17 is displayed. In the dynamic equivalent load calculation screen, the theoretical radial load $F_r$ and the theoretical axial load $F_a$ determined from the working conditions are inputted into the text boxes 78 and 79 by using the key board 4, as well as the number of rotation, for example, "5000" $\text{min}^{-1}$ is inputted into the text box 80 by using the key board 4. In this case, if plural working conditions are present, the additional input button 82 is selected by the mouse 5 and then the theoretical radial load $F_r$, theoretical axial load $F_a$, the number of rotation N and the working condition ratio are inputted by using the key board 4.

In the state where the inputs have been completed, the computation for the formula (4) is conducted by selecting the calculation execute button 72 by the mouse 5 to calculate the dynamic equivalent load P, and the average number of rotation N is calculated in a case where the plural working conditions are present, and the number of rotation inputted to the text box 80 is calculated as the number of rotation N in a case of single condition, and the calculated dynamic equivalent load P and the average number of rotation N are displayed in the text boxes 83 and 84.

Then, when the reflect button 73 is selected by the mouse 5, the dynamic equivalent load calculation screen is closed and the new life calculation formula screen of FIG. 13 is actuated to display the calculated dynamic equivalent load P and the average number of rotation N in the text boxes 57 and 61. Further, for example, in a case where the calculated dynamic equivalent load P exceeds 50% of the basic dynamic rated load C or exceeding the basic static rated load $C_0$, a warning message is displayed.

Then, when the calculation execute button 42 is selected by the mouse 5, the maximum rolling element load $Q_{max}$, and the contact ellipse area S are calculated based on the inputted data, further, the standardized foreign substance diameter ($d_{debris}/\sqrt{S}$) is calculated from the calculated contact ellipse area S and the inputted mixed foreign substance diameter $d_{debris}$, and the life correction coefficient $a_{xyz}$ is calculated based on the empirical formula (8) based on the calculated standardized foreign substance diameter ($d_{debris}/\sqrt{S}$), the formula (2) is calculated based on the life correction coefficient $a_{xyz}$ and the calculated dynamic equivalent load P, and the result output screw shown in FIG. 18 is displayed, to display the contact ellipse area S, the standardized foreign substance diameter ($d_{debris}/\sqrt{S}$), the reliability coefficient $a_1$, the life correction coefficient $a_{xyz}$, the basic rated life $L_{10}$ and the correction rated life $L_{nm}$ into the text box 141 to text box 146.

When the print button 92 is selected by the mouse 5 and clicked on the result output screen, all the data displayed on the result output screen are printed by the printer 6.

Then, it is judged as to whether the calculated bearing life can satisfy the bearing life desired by a user or not and the processing is ended if it is satisfied. However, if the bearing life desired by the user is not satisfied, the bearing number is changed to make the size of the bearing to be used larger, or the foreign substance mixed diameter is changed or the like and the correction rated life $L_{nm}$ is calculated again based thereon to select the rolling bearing that can satisfy the bearing life desired by the user.

(3) Third Embodiment

Rolling Bearing Selecting Device Using the Life Predicting Device

Then, a rolling bearing selecting device using the life predicting device of a third embodiment according to the present invention is to be described.

Figure 19:
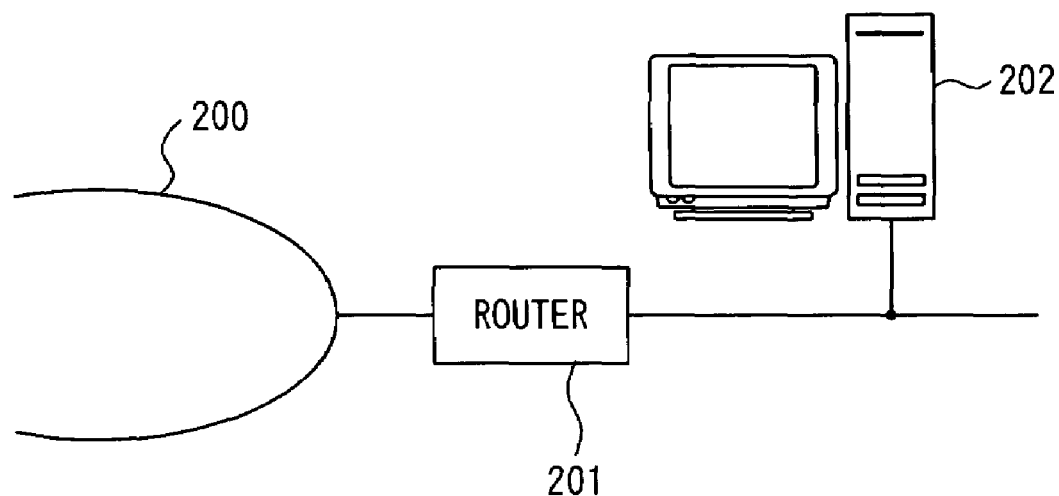
FIG. 19 is a view showing a constitution of a bearing selecting device as an embodiment of the present invention.

The rolling bearing selecting device is, as shown in FIG. 19, applied to a WWW (World Wide Web) server 202, which is connected to an internet 200 by way of a router 201, in which an electronic catalog for storing a bearing selection application software including a life predicting application software and specification information for rolling bearings are stored in the hard disk thereof.

The bearing selection application software executes the rolling bearing selection processing including the life predicting processing for rolling bearings in the life predicting device of the second embodiment described above based on the inputted specification information utilizing the table calculation application software or the like to present optimal bearing, optical operation condition and life predicting time desired by a user.

Figure 20:
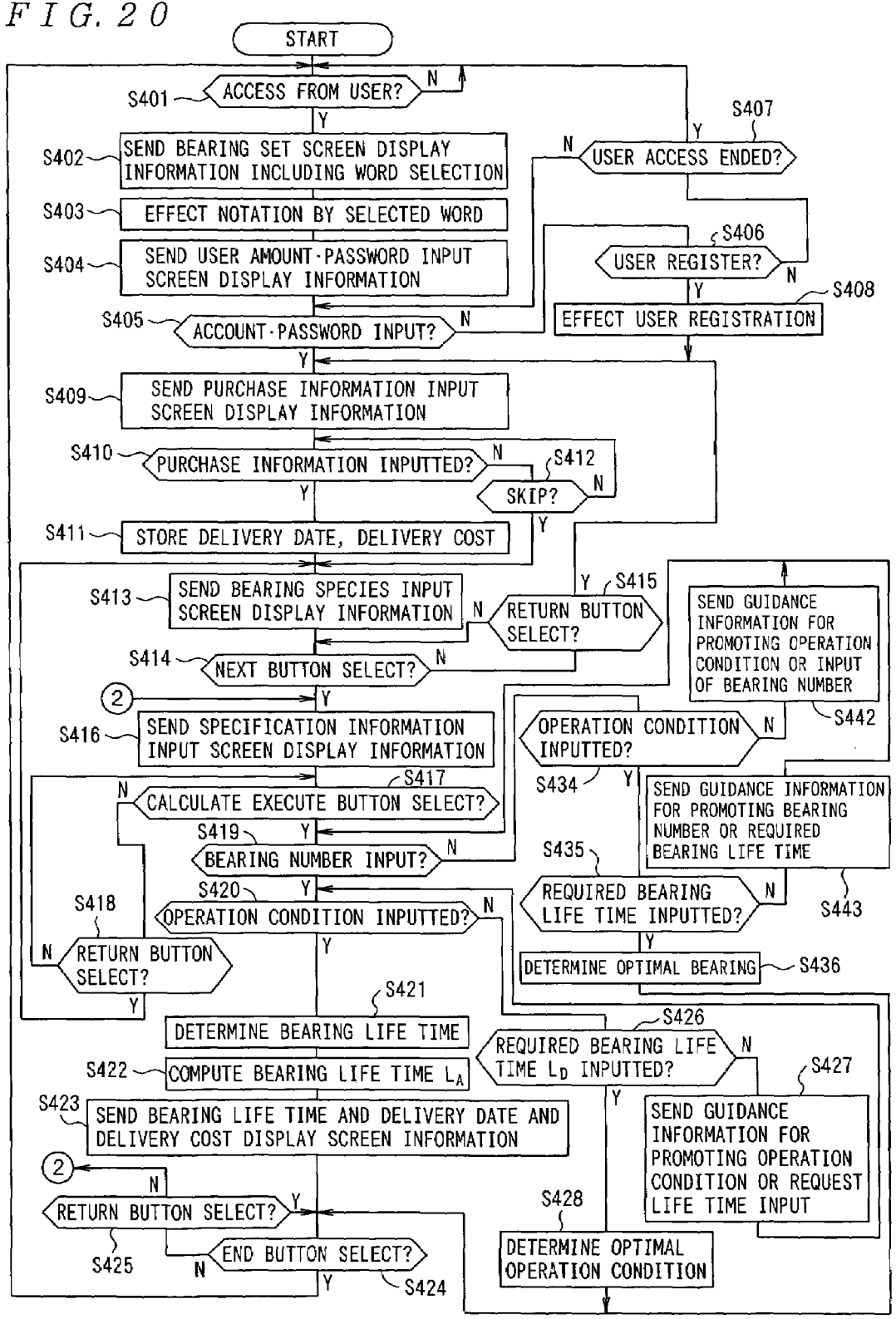
FIG. 20 is a flow chart showing an example of a bearing selecting processing method executed by a WWW server.

In the rolling bearing selecting processing, as shown in FIG. 20, it at first judges at step S401 whether there is an access from a information processing apparatus such as a personal computer of a user by way of the internet 200 and, in a case if there is no access from the user, it stands-by till the access arrives. In a case where the access arrives from the user, it goes to step S402 and sends a display information for the displaying the bearing the selection screen having a language selection section for selecting Japanese, English, German, French, etc. as the language, then goes to step S403, judges what language is selected, executes the notation processing for the selected language and then goes to step S404.

At the step S404, it requests for the input of the user's account information and password, sends an input screen information for promoting the user registration to a user's information processing apparatus in a case where the user is not registered and then goes to step S405 and judges whether the input of the user's account information and the password has been conducted or not. In a case if the input for them has been conducted, it goes to step S409 to be described later and in a case where the input for the user's account information and the password is not conducted, it goes to step S406, judges whether the user registration has been selected or not and if it is not selected, it goes to the step S407, judges whether the user's access is ended or not and returns to the step S401 in a case where the user's access is ended. In a case where the user access is not ended, it returns to the step S405.

Further, as the result of judgment at the step S406, if the user registration is selected, it goes to step S408, executes user registration processing and then goes to step S409. In the user registration processing, it sends an input screen information for displaying the input screen that inputs full name, company name, division name, electronic mail address or telephone number to the users information processing apparatus and, when predetermined items have been inputted to the input screen information, issues the user's account information and password, ends the processing and goes to the step S409.

At the step S409, it sends purchase information input screen information for inputting the desired bearing delivery date and desired bearing cost to the user's information processing apparatus, then goes to step 410, and judges whether the desired delivery date and the desired cost of the bearing have been inputted or not based on the purchase information input screen information. When one or both of them has been inputted, it goes to step S411, stores the inputted desired bearing delivery date and/or desired cost to a predetermined memory area and then goes to step S413. In a case if the bearing desired delivery date and the delivery cost are not inputted, it goes to step S412 and judges whether a skip button is selected or not. In a case if the step button is not selected, it returns to the step 410 and in a case if the skip button is selected, it goes to step S413.

Figure 21:
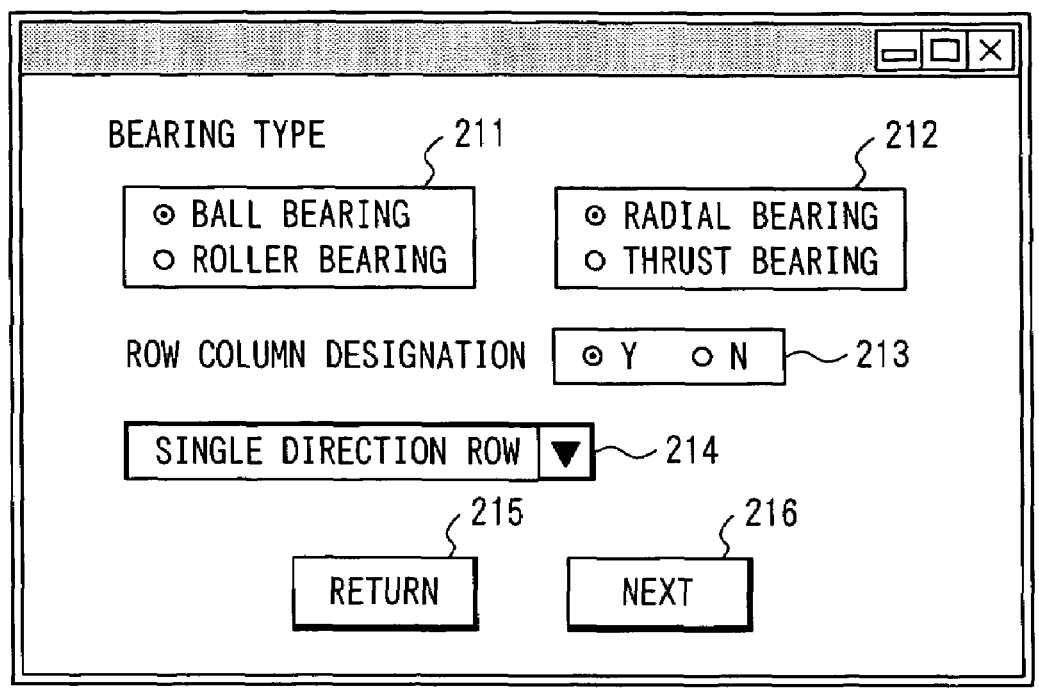
FIG. 21 is an explanatory view showing the screen for the input of bearing species.

At step S413, it sends a display information for displaying the bearing species display screen shown in FIG. 21 for inputting the bearing species to the user's information processing apparatus. The bearing species display screen displays a check box 211 for selecting whether the bearing is a ball bearing or the roller bearing, a check box 212 for selecting whether the bearing is a radial bearing or a thrust bearing, a check box 213 for selecting the presence or absence of the designation for the row, a dropdown box 214 for selecting single row, double row and plural row, a return button 215 and a next button 216, in which the check boxes 211 and 212 are set as essential input items.

Then, it goes to step S414 and judges whether the next button 216 is selected or not. In a case if the button is not selected, it goes to step S415 and judges whether the return button 215 is selected or not. In a case if the button is not selected, it returns to the step S414 and, if the button is selected, it returns to the step S409.

Figure 22:
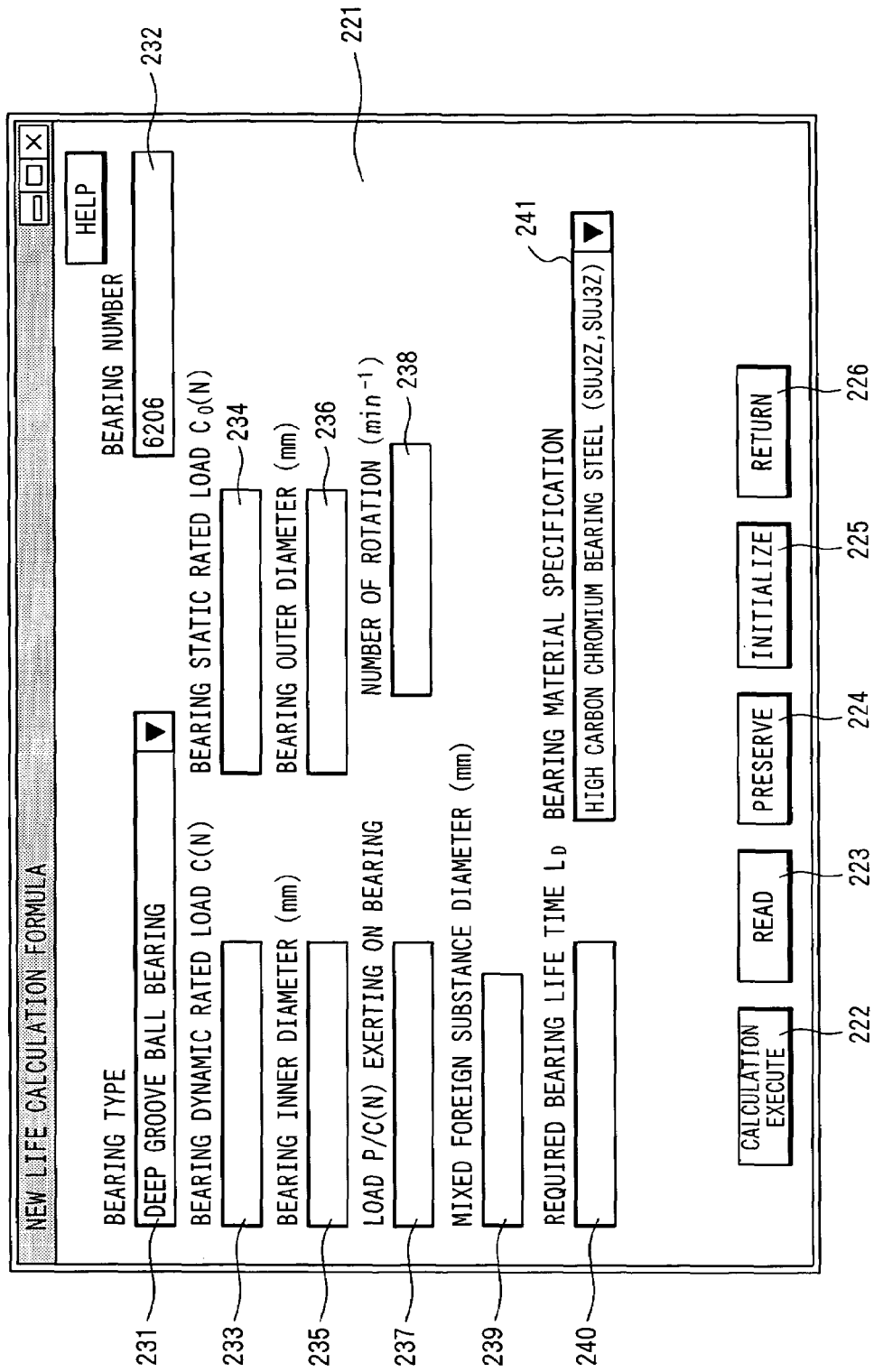
FIG. 22 is an explanatory view showing a screen for the input of specification information.

Further, as the result of judgment at the step S414, in a case where the next button 216 is selected, it goes to step S416, and sends the display information for displaying the specification information input screen shown in FIG. 22 to the user's information processing apparatus. The specification information input screen has a display area 221 for displaying predetermined items, a calculation execute button 222, a read button 223, a preserve button 224, an initialize button 225 and a return button 226 arranged below the display area 221.

In this case, the display area 221 comprises a combo box 231 for selecting the bearing type, a text box 232 for inputting the bearing number, a text box 233 for inputting the bearing dynamic rated load C, a text box 234 for inputting the bearing static rated load $C_0$, a text box 235 for inputting the bearing inner diameter d, a text box 236 for inputting the bearing outer diameter D, a text box 237 for displaying load P/C exerting on the bearing, a text box 238 for inputting the number of rotation, a text box 239 for inputting the mixed foreign substance diameter, a text box 240 for inputting the required bearing life time $L_D$ and a combo box 241 for selecting the specification of the bearing material. Then, "high carbon chromium bearing steel (SUJ2Z, SUJ3Z)" is displayed as the default value in the combo box 241 for the specification of the bearing material. Further, by selecting the read button 223 in a state of inputting the bearing number into the text box 232, the bearing dynamic rated load C, the bearing static rate load $C_0$, the bearing inner diameter, and the bearing outer diameter corresponding to the bearing number are displayed respectively in the text boxes 233 to 236. By selecting the preserve button 224, each of the data stored in the display area 221 is preserved and, when the initialized button 225 is selected, the data in the display region 221 return to the initial state.

Then, it goes to step S417 and judges whether the calculation execute button 222 is selected or not and in a case if the calculation executed button is not selected, it goes to step S418 and judges whether the return button 226 is selected or not. In a case if the return button 226 is selected, it goes to the step S413 and, in a case if the return button 226 is not selected, it returns to the step 417.

Further, in a case where the calculation execute button 222 is selected as a result of judgment at the step S317, it goes to step S419 and judges whether the bearing number is inputted or not. In a case where the bearing number is inputted, it goes to step S420 and judges whether the operation condition items of the load P/C exerting on the bearing, the number of rotation of the bearing, the mixed foreign substance diameter and the specification for the bearing material are inputted or not. In a case if the operation condition items are inputted, it judges that the user requests for the bearing life time and goes to step S422 and calculates the dynamic equivalent load P, the maximum rolling element load $Q_{max}$, the contact ellipse area S ($\mu m^2$), the standardized foreign substance diameter ($d_{debris}/\sqrt{S}$), and the life correction coefficient $a_{xyz}$ in the same manner as the processing conducted by the life predicting device of the first embodiment described above and calculates the correction rated life $L_{nm}$ based thereon. For the values necessary in the course till the correction rated life $L_{nm}$ is obtained and which are not requested for the user to input, general default values are used for instance.

It calculates the correction rated life $L_{nm}$ and then goes to step S423 to display the correction rated life $L_{nm}$, and sends the display screen information for displaying the optimal delivery date and delivery cost of the bearing to the user's information processing apparatus and then goes to step S424, and judges whether the end button included in the display screen information is selected or not. In a case if the end button is selected, it returns to the step S401 and in a case if the end button is not selected, it goes to step S425 and judges whether the return button is selected or not. In a case if the return button is selected, it returns to the step S416 and, in a case if the return button is not selected, it returns to step S424.

Further, in a case where the operation condition items are not inputted as the result of judgment at the step S420, it goes to step S426 and judges whether the required bearing life time $L_D$ is inputted or not. In a case where the required bearing life time $L_D$ is not inputted, it goes to step S427, sends a guidance information for promoting the input of the operation conditions for the required bearing life time to the user's information processing apparatus and then returns to the step S420. In a case if the required bearing life time $L_D$ is inputted, it judges that the user requests for the optimal operation conditions, goes to step 428 and effects the optimal operation condition deciding processing.

Figure 23:
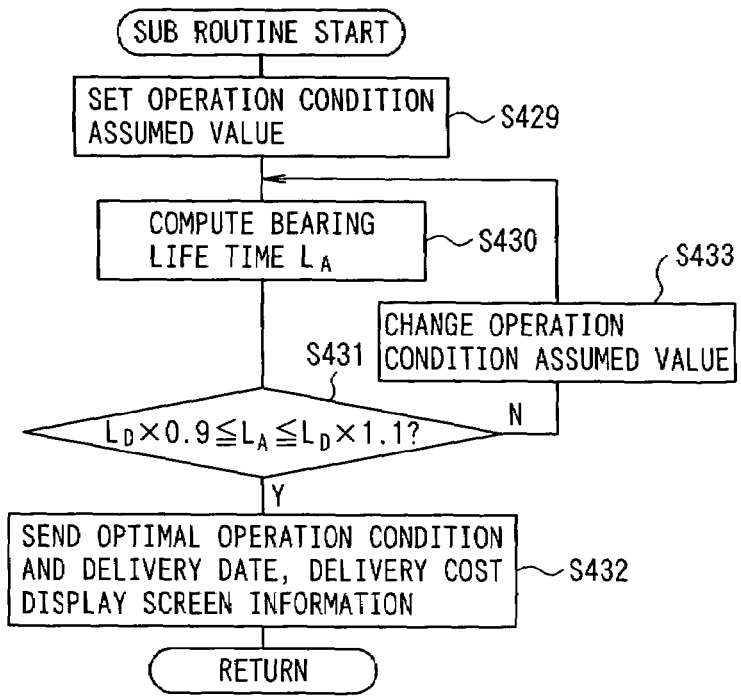
FIG. 23 is a flow chart showing an example of an optimal operation condition determining processing method of FIG. 20.

In the optimal operation condition determining processing, as shown in FIG. 23, it at first goes to step S429 and sets an assumed value as the operation condition.

The assumed values are set to those values considered appropriate for necessary values for calculation such as of setting P/C=0.1 as the assumed value for the load exerting on the bearing, setting a value $\frac{1}{10}$ for the allowable number of rotation as the assumed value for the number of rotation of the bearing and setting SUJ2 as the assumed value for the bearing material.

Then, it goes to step S430, calculates the dynamic equivalent load P, the maximum rolling element load $Q_{max}$, the contact ellipse area S ($\mu m^2$), the standardized foreign substance diameter ($d_{debris}/\sqrt{S}$), and the life correction coefficient $a_{xyz}$, in the same manner as the processing conducted by the life predicting device of the first embodiment described above based on each of the assumed values and the bearing dynamic rated load C and the bearing static rated load $C_0$ based on the bearing number, calculates the correction rated life $L_{nm}$ based thereon and then goes to step 431.

At the step S431, it judges whether the calculated correction rated life $L_{nm}$ is, for example, within ±10% of the required bearing life time $L_D$. In a case of: $L_D \times 0.9 \leq L_{nm} \leq L_D \times 1.1$, it judges that the assumed operation conditions are optimal conditions, goes to step S431, sends the display information for the optimal condition display screen for displaying the optimal operation conditions to a user's information processing device, then conducts the display and sends the display screen information for displaying the delivery time and the delivery cost of the optimal bearing to the user's information processing device, then ends the sub-routine processing and goes to the step S424 of FIG. 20.

Further, in a case where the result of judgment at the step S431 shows: $L_{nm} < L_D \times 0.9$ or $L_D > L_D \times 1.1$, it goes to step S433, changes the assumed values for the operation conditions to the previously set next assumed values and then goes to the step S430.

Now referring again to the FIG. 20, in a case if the result of judgment at the step S419 shows that the bearing number is not inputted, it goes to step S434, judges whether the operation conditions described above are inputted or not. In a case where the operation conditions are inputted, it goes to step 435, and judges whether the required bearing life time $L_D$ is inputted or not. In a case if the required bearing life time $L_D$ is inputted, it judges that the user requires selection for the optimal bearing, goes to step 436 and executes the optimal bearing determining processing.

Figure 24:
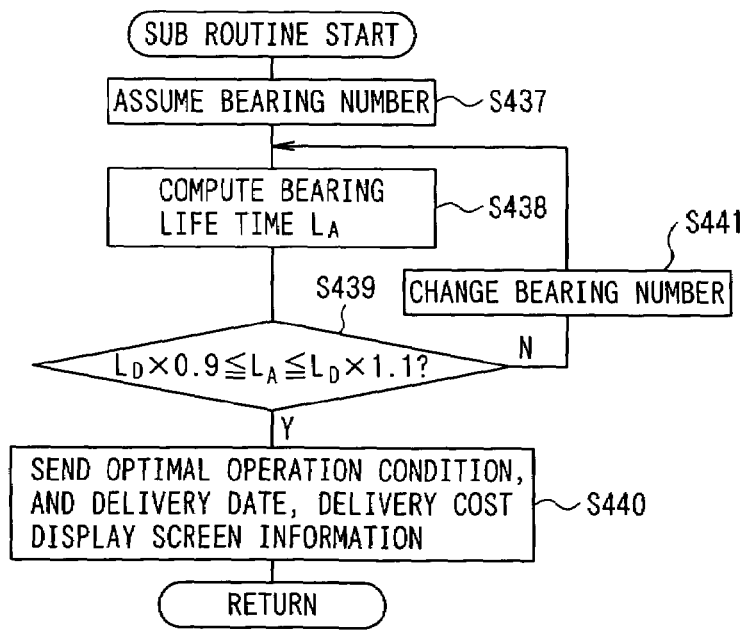
FIG. 24 is a flow chart showing an example of an optimal bearing determining processing method of FIG. 20.

In the optimal bearing determining processing, as shown in FIG. 24, it at first refers to the bearing type at step S437 and assumes the bearing number 6206 for the deep groove ball bearing or the bearing number 7206 for the angular ball bearing in a case of a standard bearing of large bearing production amount, for example, a radial ball bearing, the bearing number NU206 for the cylindrical roller bearing in a case of the radial roller bearing, or the bearing number HR30206 for the tapered roller bearing in a case of the radial roller bearing, assuming the bearing number 51306 for the thrust ball bearing in the case of the thrust ball bearing, and assuming the bearing number 29420 for the thrust self-aligning roller bearing in a case of the thrust roller bearing.

Then, it goes to step S438, calculates the dynamic equivalent load P, the maximum rolling element load $Q_{max}$, the contact ellipse area ($\mu m^2$), the standardized foreign substance diameter ($d_{debris}/\sqrt{S}$), and the life correction coefficient $a_{xyz}$ in the same manner as the processing conducted by the life predicting device of the first embodiment described above based on the assumed bearing number and the operation conditions, calculates the correction rated life $L_{nm}$ based on them and then goes to step S439.

At the step S439, it judges whether the calculated correction rated life $L_{nm}$ is, for example, within ±10% of the inputted required bearing life time $L_D$ and, in a case of: $L_D \times 0.9 \leq L_{nm} \leq L_D \times 1.1$, judges that the assumed bearing number is the optimal condition, goes to step S440, displays the optimal bearing number, sends the optimal bearing selection display screen information for displaying the delivery time and the delivery cost for the optimum bearing to the user's information processing device and then goes to the step S424.

Further, in a case where the result of the judgment at the step S439 shows: $L_{nm} \leq L_D \times 0.9$ or $L_m \geq L_D \times 1.1$, it goes to step S441, changes the assumed bearing number to a larger or smaller value and then returns to the step S438.

Referring again to FIG. 20, in a case where the result of judgment at step S434 shows that the operation conditions are not inputted, it goes to step S442, sends a guidance information of promoting input of the bearing number or the operation conditions to the user's information processing device and then returns to the step S419. Further, in a case where the result of judgement at the step S435 shows that the required bearing life time $L_D$ is not inputted, it goes to step S443, sends a guidance information of promoting input for the bearing number or the required bearing life time $L_D$ to the user's information processing device and then returns to the step S419.

Then, the operation of the rolling bearing selection device is to be explained.

Now, when a user accesses by way of the internet 200 to the WWW server 202, the user registration input screen for inputting the user's account information and password are at first displayed and the bearing selection processing can be executed on the user registration input screen in a case of a user already registered. However, in a case of a user who is not yet registered, user registration is conducted by inputting predetermined items on the user registration screen, by which the user account information and password are set and the bearing selection processing is executed.

In the bearing selection processing, the bearing species input screen shown in FIG. 21 is displayed, the essential input item, i.e., whether it is a ball bearing or a roller bearing is selected on the bearing species input screen, and it is selected for the radial bearing or the thrust bearing. Since the row designation is an optional selection item, it not necessary for designation.

Then, at the instance the selection for the essential items has been completed, when the next button 216 is selected, an input screen for input of the desired delivery date and the desired cost is displayed and one or both of the desired delivery date and the desired cost are inputted in a case where they are necessary and the screen is skipped when they are not necessary.

Then, a specification information input screen shown in FIG. 22 is displayed. In a case where the bearing such as a deep groove rolling bearing, an angular ball bearing, a cylindrical roller bearing, a self-aligning roller bearing, or the like is determined on the specification information input screen and where the correction rated life $L_{nm}$ is intended to know for the bearing for which the bearing number is determined, at least the load P/C exerting on the bearing, the number of rotation of the bearing and the mixed foreign substance diameter as the essential input items are inputted. In a case where the mixed foreign substance diameter is not inputted, a general or average foreign substance diameter is set. Further, in a case where the bearing material is not inputted, SUJ2 is set.

When the input for the operation conditions has been completed and when the calculation executed button 222 is selected, it executes the same computation as by the life predicting device of the first embodiment described above to calculate the dynamic equivalent load P, the maximum rolling element load $Q_{max}$, the contact ellipse area S ($\mu m^2$), the standardized foreign substance diameter ($d_{debris}/\sqrt{S}$), and the life correction coefficient $a_{xyz}$, calculates the correction rated life $L_{nm}$ based thereon and outputs the calculated correction rated life $L_{nm}$ to the display 3 or the printer 6.

Further, in a case where it is intended to know the optimal operation conditions, a bearing number is inputted, and the required bearing life time $L_D$ is inputted on the specification information input screen of FIG. 22.

In this case, when the required bearing life time $L_D$ is inputted as "50,000 hr" for the bearing number "6306", for example, and the calculation execute button 222 is selected, an assumed value P/C=0.1 (P=2670N) is set as the load P/C exerting on the load bearing, 5000 rpm is set as the assumed value for the number of rotation of the bearing and a general or average value is set as the assumed value for the mixed foreign substance diameter.

When the same life calculation processing as in the first Example is conducted based on the conditions, concrete values are calculated for the dynamic equivalent load P, the maximum rolling element load $Q_{max}$, the contact ellipse area S ($\mu^2$), the value for ($d_{debris}/\sqrt{S}$), and the life correction coefficient $a_{xyz}$, and a concrete value for the correction rated life $L_{nm}$ is calculated based thereon.

Then, the correction rated life $L_{nm}$ and the required bearing life time $L_D$ are compared and the predicting computation is conducted again till the correction rated life $L_{nm}$ satisfies the required bearing life time $L_D$. Then, if it is satisfied, the correction rated life $L_{nm}$ and the bearing number are displayed, and an answer screen displaying the estimated sum and the delivery time for the bearing is displayed on the display 3.

(4) Other Embodiments

In the embodiments described above, while description has been made to a case where the life correction coefficient $a_{xyz}$ has only the mixed foreign substance diameter $d_{debris}$ as the variable, but this is not limitative. for example, computation is conducted for determining the life correction coefficient $a_{xyz}$ by using variables such as fatigue limit load Pu, lubrication state (kinetic viscosity) κ and environment coefficient (contamination degree of lubricant) $a_c$ in accordance with the proposal of ISO 281 in February, 2000, and the portion for the computation processing of the environmental coefficient (contamination degree of lubricant) $a_c$ is conducted by using the mixed foreign substance diameter $d_{debris}$ by the computation described above by applying the present invention.

Further, in the foregoing embodiment, while description has been made to a case of the ball bearing setting the load index p at 3, this is applicable also to a roller bearing setting the load index as: p=10/3. This is applicable also in the same manner as in the embodiment described above by determining the contact ellipse area (bearing dimension specification) and working condition (load, average mixed foreign substance diameter, etc.).

Further, in the foregoing embodiments, while the contact ellipse area S ($\mu m^2$) is determined by using the Herz's elastic contact theory, the contact ellipse area may be determined by using other theories or empirical formulas.

Further, in the embodiments described above, while the standardized foreign substance diameter ($d_{debris}/\sqrt{S}$) as the standardized characteristic quantity is calculated defining the typical dimension for the portion of the bearing in contact with the mixed foreign substance as $\sqrt{S}$ and the characteristic quantity showing the size of the mixed foreign substance as the diameter $d_{debris}$ thereof and the life correction coefficient $a_{xyz}$ is obtained based on the calculated standardized foreign substance diameter ($d_{debris}/\sqrt{S}$), this is not limitative. That is, the life correction coefficient $a_{xyz}$ is obtained, for example, by determining the value $\alpha$ for the ratio using the dimension for other portion as the typical dimension for the portion of the bearing to be in contact with the mixed foreign substance or using other dimension capable of showing the characteristic of the foreign substance as the characteristic quantity of the mixed foreign substance thereby obtaining the coefficient according to the determined value $\alpha$ for the ratio.

Further, the standardized foreign substance diameter is defined as a dimension value by dividing $d_{debris}$ as the characteristic quantity showing the size of the mixed foreign substance by $\sqrt{S}$ as the typical dimension for the portion in contact with the mixed foreign substance, but this is not limitative. For example, the value $\alpha$ for the ratio may be a reciprocal of the standardized foreign substance diameter or may be a dimensional value.

Further, in the embodiments described above, while the empirical formula (8) is obtained assuming the evaluation value coefficient as $a_1$ the empirical formula may be determined also by other evaluation value coefficient $a_1$ in the same manner. In this case, the empirical formulae can be determined corresponding to plural evaluation value coefficients $a_1$ and variation for the selection of empirical formulae usable by the user can be increased for instance. In this case, in the second embodiment described above, for example, the user can obtain the correction rated life $L_{nm}$ based on the optimal empirical formula in accordance with the working conditions, etc.

Further, in the embodiment described above, while description has been made to a case of executing the program by using a personal computer, it is not limitative but it may be executed also by using other information processing terminals.

Further, in the embodiment described above, while description has been made to a case of installing the bearing selection program in the WWW server 202 but this is not limitative. A bearing selection program may be installed to a server connected with a local area network and an information processing terminal such as a personal computer may take access by way of the local area network server.

Further, in the embodiment described above, while description has been made to a case of conducting user registration by the WWW server 202 but it is not limitative. User registration may also be conducted by using postal mailing or facsimile.

Further, in the embodiment described above, while description has been made to a case of installing the bearing selection application program in the hard disk of the WWW server 202, this is not limitative. It may be stored into memory medium such as a compact disk (CD) or optomagnetic disk (MO) other than the hard disk and carried about, or may be installed to other information processing devices.

According to the present invention, in a life predicting method for a rolling bearing for conducting life prediction of a rolling bearing specified such that a basic dynamic rated load C and a basic static rated load $C_0$ can be calculated, since the rated correction life $L_{10}$ of a rolling bearing at a reliability factor $a_1$ is calculated according to:

$$L_{nm} = a_1 \times a_{xyz} \times (C/P)^p$$

$$a_{xyz} \propto f(\alpha)$$

where P represents an equivalent load, p represents a load index, $a_{xyz}$ represents a life correction coefficient, and $\alpha$ represents a ratio between a typical dimension for a portion of a bearing to be in contact with mixed foreign substance and a characteristic quantity showing the size of the mixed foreign substance, the live corrected coefficient $a_{xyz}$ can be set in accordance with the characteristic quantity showing the size of the mixed foreign substance and, further, since the value $\alpha$ for the ratio with respect to the typical dimension for the portion of the bearing in contact with the mixed foreign substance is used for the setting thereof, the life correction coefficient $a_{xyz}$ can be set in accordance with the mixed foreign substance not depending on the size of the bearing. Thus, the life can be predicted at a improved accuracy for the correction rated life.

Further, since the value $\alpha$ for the ratio is calculated according to:

$$\alpha = d/\sqrt{S}$$

where $\sqrt{S}$ represents the typical dimension assuming a typical diameter of the mixed foreign substance as d, and a contact ellipse area in the bearing as S, the life correction coefficient $a_{xyz}$ can be set by determining the value a for the ratio using the contact ellipse area in the bearing and by the determined value $\alpha$ for the ratio.

Further, since the function f has the viscosity ratio κ of the lubricant, the fatigue limit load Pu and the contamination factor $a_c$ as variants, and the contamination $a_c$ has the value $\alpha$ for the ratio as a variant, the present application is applicable also in a case of determining the correction rated life based on the life correction coefficient $a_{xzy}$ having the lubricant viscosity ratio κ, the fatigue limit load Pu and the contamination degree coefficient $a_c$ as variants proposed by ISO 281 in February, 2000.

The invention claimed is:

1. A method to predict a life using a computer of a rolling bearing having a basic dynamic rated load C and a basic static rated load $C_0$, comprising calculating the rated correction life $L_{nm}$ of a rolling bearing at a reliability coefficient $a_1$ according to the relationship:

$$L_{nm} = a_1 \times a_{xyz} \times (C/P)p$$

$$a_{xyz} \propto f(\alpha)$$

where P represents an equivalent load, p represents a load index, $a_{xyz}$ represents a life correction coefficient, and α represents a ratio between a dimension for a portion of a bearing to be in contact with a mixed foreign substance and a characteristic quantity showing a size of the mixed foreign substance, wherein the ratio α is calculated according to the relationship:

$$\alpha = d/\sqrt{S}$$

where $\sqrt{S}$ represents the dimension assuming a diameter of the mixed foreign substance as d, and a contact ellipse area in the bearing as S, and presenting the calculated rated correction life.

2. The life predicting method according to claim 1, wherein the function f is determined based on an empirical formula obtained by mixing foreign substances having different characteristic quantities with respect to the size respectively.

3. The life predicting method according to claim 2, wherein the function f has a viscosity ratio K of a lubricant, a fatigue limit load Pu and a contamination coefficient $a_c$ as variables, and the contamination $a_c$ has the value α for the ratio as a variable.

4. A device for predicting a life of a rolling bearing having a basic dynamic rated load C and a basic static rated load $C_0$, comprising:

a specification information inputting means for inputting specification information containing a basic dynamic rated load C and a basic static rated load $C_0$ of the rolling bearing; a dynamic equivalent load computation means for computing a dynamic equivalent load based on the specification information inputted by the specification information inputting means; a reliability setting means for setting a reliability coefficient; a dimension determining means for determining a dimension for a portion of a bearing in contact with mixed foreign substance, a mixed foreign substance characteristic quantity inputting means for inputting a characteristic quantity showing the size of the mixed foreign substance; a ratio computing means for computing the value for the ratio between the dimension and the characteristic quantity; a life correction coefficient setting means for setting a life correction coefficient based on the value ratio; a bearing life computation means for computing the bearing life based on the reliability coefficient, the life correction coefficient, the basic dynamic rated load, the dynamic equivalent load and the load index, and means for presenting the computed bearing life, wherein the ratio computation means obtains the value for the ratio by dividing the diameter of the mixed foreign substance with the dimension as the square root for the contact ellipse area.

5. A device for predicting a life of a rolling bearing having a basic dynamic rated load C and a basic static rated load $C_0$, comprising:

a specification information inputting means for inputting specification information containing a basic dynamic rated load C and a basic static rated load $C_0$ of the rolling bearing; a dynamic equivalent load computation means for computing a dynamic equivalent load based on the specification information inputted by the specification information inputting means; a reliability setting means for setting a reliability coefficient; a dimension determining means for determining a dimension for a portion of a bearing in contact with mixed foreign substance; a mixed foreign substance characteristic quantity inputting means for inputting a characteristic quantity showing a size of the mixed foreign substance; a ratio computing means for computing the value for the ratio between the dimension and the characteristic quantity; a life correction coefficient setting means for setting a life correction coefficient based on the value ratio; a bearing life computation means for computing the bearing life based on the reliability coefficient, the life correction coefficient, the basic dynamic rated load, the dynamic equivalent load and the load index; a re-computation judging means for judging whether the re-computation of aligning a desired life is necessary or not when the result of computation of the bearing life computation means does not correspond to the desired life, and means for presenting the computed bearing life, wherein the ratio computation means obtains the value for the ratio by dividing the diameter of the mixed foreign substance with the dimension as the square root for the contact ellipse area.

6. The life predicting device according to claim 4 or 5, wherein the life correction coefficient setting means sets a life correction coefficient obtained by substituting the value for the ratio in the empirical formula obtained by mixing the foreign substance having different characteristic quantities respectively regarding the size in the bearing.

7. The life predicting device according to claim 4 or 5, wherein the life correction coefficient setting means sets the life correction coefficient with reference to a viscosity ratio of a lubricant, a fatigue limit load and a contamination degree coefficient which changes depending on the value for the ratio.

8. A computer-readable memory medium storing a life predicting program for predicting life of a rolling bearing having a basic dynamic rated load C and a basic static rated load $C_0$, comprising descriptions for executing, by a computer: inputting specification information containing the basic dynamic rated load C and the basic static rated load $C_0$ of the rolling bearing; computing a dynamic equivalent load based on the specification information; determining a dimension for a portion of the bearing in contact with mixed foreign substance; inputting a characteristic quantity indicating a size of the mixed foreign substance; computing the value for the ratio between the dimension and the characteristic quantity; setting the life correction coefficient based on the value for the ratio; computing the bearing life based on the reliability coefficient, the life correction coefficient, the basic dynamic rated load, the dynamic equivalent load, and a load index, and presenting the calculated rated correction life, wherein the ratio α is calculated according to the relationship:

$$\alpha = d/\sqrt{S}$$

where $\sqrt{S}$ represents the dimension assuming a diameter of the mixed foreign substance as d, and a contact ellipse area in the bearing as S.

9. A computer-readable memory medium storing a life predicting program for predicting life of a rolling bearing having a basic dynamic rated load C and a basic static rated load $C_0$, comprising descriptions for executing, by a computer; inputting specification information containing the basic dynamic rated load C and the basic static rated load $C_0$ of the rolling bearing; computing a dynamic equivalent load based on the specification information; determining a dimension for a portion of the bearing in contact with mixed foreign substance; inputting a characteristic quantity indicating a size of the mixed foreign substance; computing the value for the ratio between the dimension and the characteristic quantity; setting the life correction coefficient based on the value for the ratio; and computing the bearing life based on the reliability coefficient, the life correction coefficient, the basic dynamic rated load, the dynamic equivalent load and the load index; judging whether re-computation for aligning a desired life in a case is necessary or not when the result of computation for the bearing life does not correspond to the desired life, and presenting the calculated rated correction life, wherein the ratio $\alpha$ is calculated according to the relationship:

$$\alpha = d/\sqrt{S}$$

where $\sqrt{S}$ represents the dimension assuming a diameter of the mixed foreign substance as d, and a contact ellipse area in the bearing as S.

10. A computer-readable memory medium storing a bearing selecting program for selecting a rolling bearing in accordance with the specification required by a user, comprising description for executing, by a computer; inputting a bearing species required by a user;

inputting necessary specification information other than the required specification information required by the user from the necessary specification information containing a basic dynamic rated load C and a basic static rated load $C_0$ of a rolling bearing; comparing the required specification information and the necessary specification information thereby assuming the not inputted specification information; predicting life by using the life predicting program according to claim 8 based on the required specification information and the assumed specification information other than that described above, judging whether the result of the life prediction can satisfy the required specification information or not; presenting the assumed specification information as the bearing selection information when the result of the life prediction can satisfy the required specification information, and changing the assumed specification information in a case when the result of the life prediction can not satisfy the required specification information and conducting re-computation by the life predicting program.

11. An environment coefficient determining method for determining a life correction coefficient used in a roller bearing life prediction, wherein the environment coefficient is determined at least by a ratio between a dimension for a portion of a bearing in contact with a mixed foreign substance and a characteristic quantity indicating a size of the mixed foreign substance, wherein the ratio $\alpha$ is calculated according to the relationship:

$$\alpha = d/\sqrt{S}$$

where $\sqrt{S}$ represents the dimension assuming a diameter of the mixed foreign substance as d, and a contact ellipse area in the bearing as S; and storing the determined environment coefficient for use in a roller bearing life prediction.

12. The life predicting device according to claim 6, wherein the life correction coefficient setting means sets the life correction coefficient with reference to a viscosity ratio of a lubricant, a fatigue limit load and a contamination degree coefficient which changes depending on the value for the ratio.

* * * * *